Aug. 25, 1942.    R. H. LAWSON    2,293,838
SELECTIVE, MACHINE STOPPING MEANS, POSITIVELY OPERATED UPON YARN
CESSATION IN YARN-CHANGING FURNISHING MECHANISM
Filed April 3, 1941    8 Sheets-Sheet 7
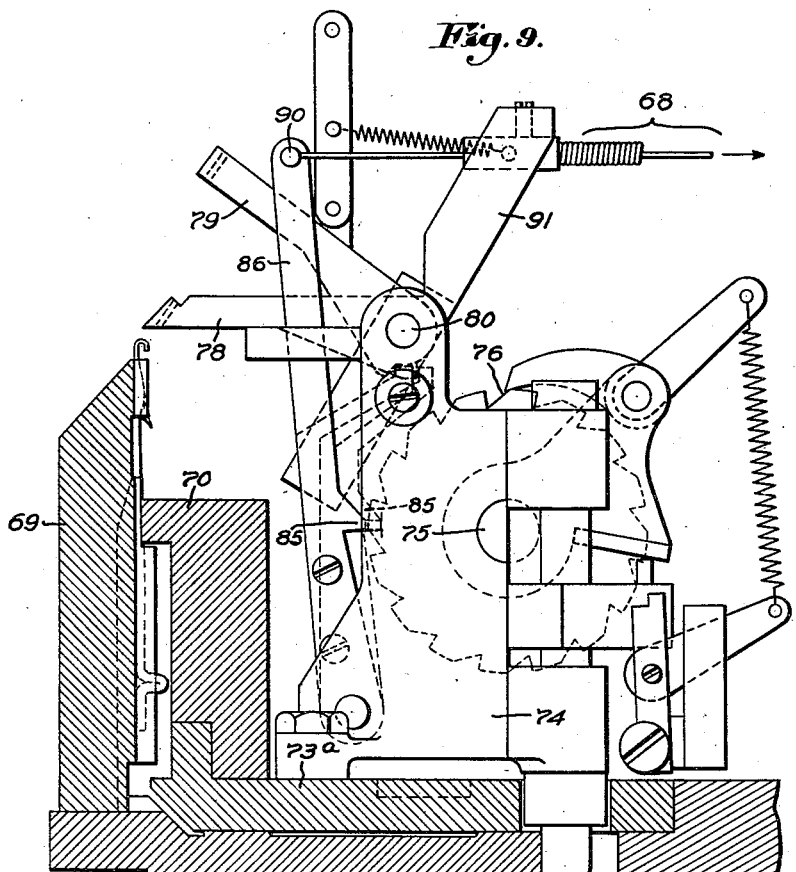
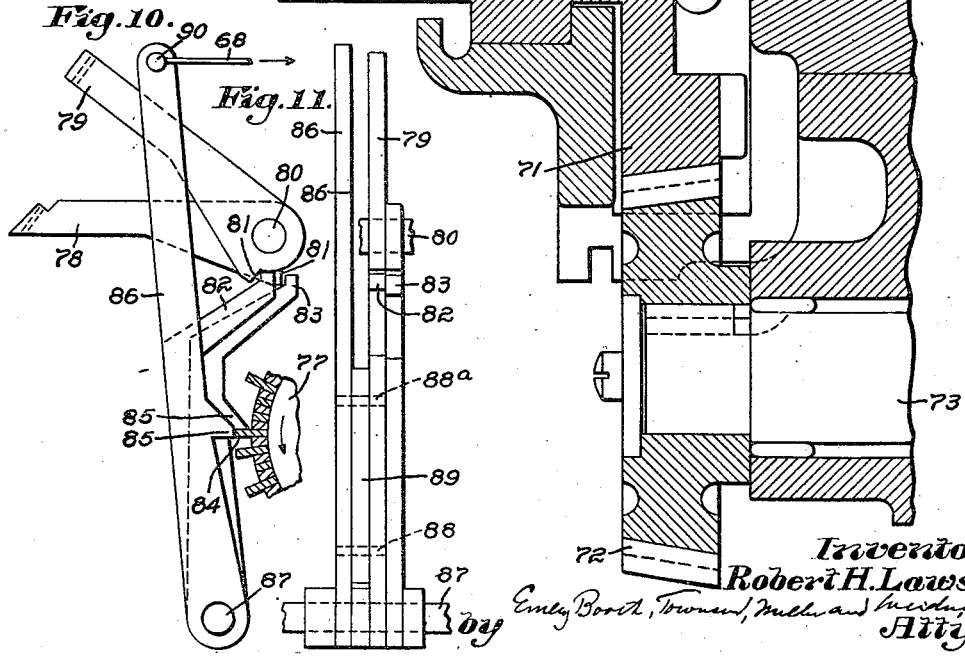
Inventor:
Robert H. Lawson,
by Emery, Booth, Townsend, Miller and Meaden
Attys.

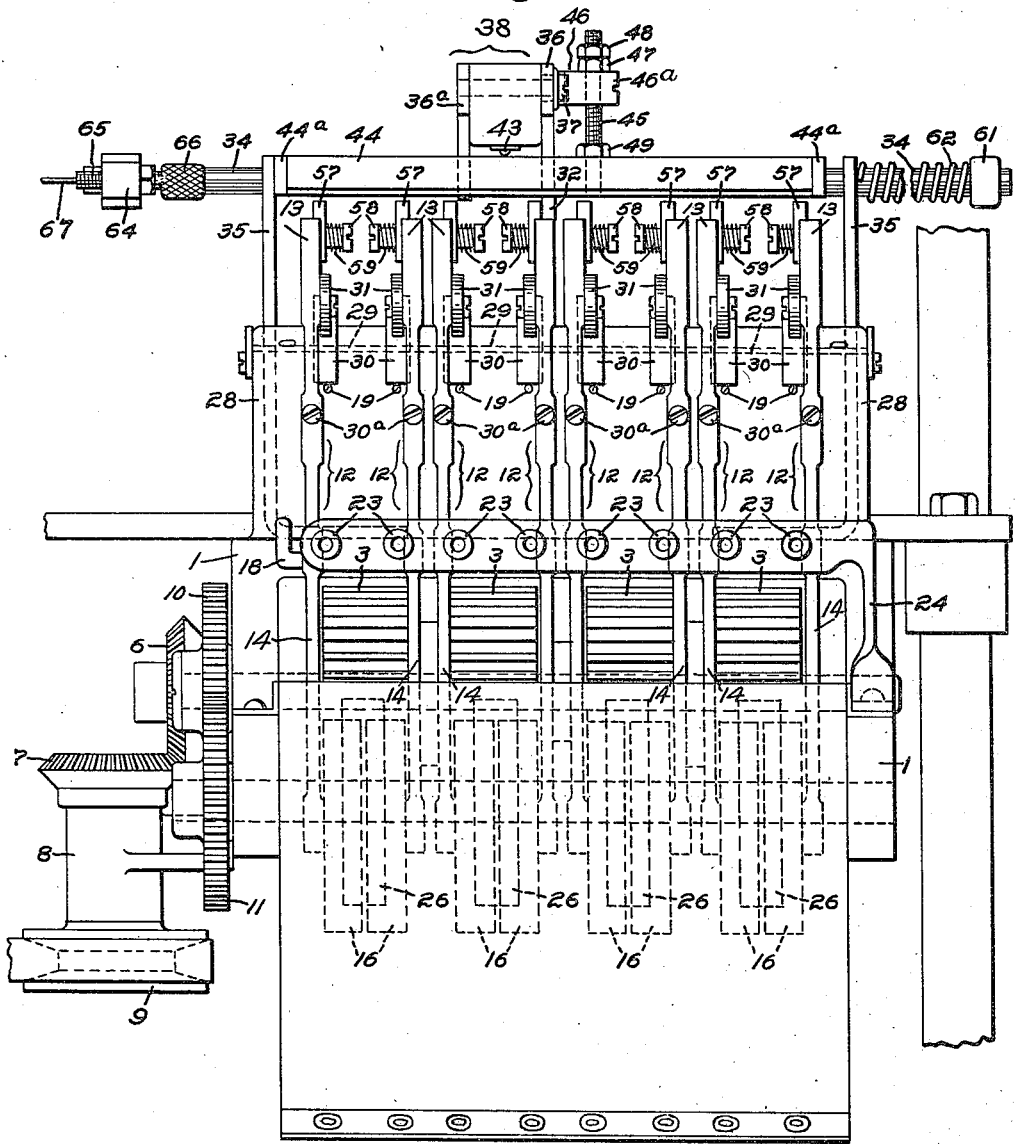

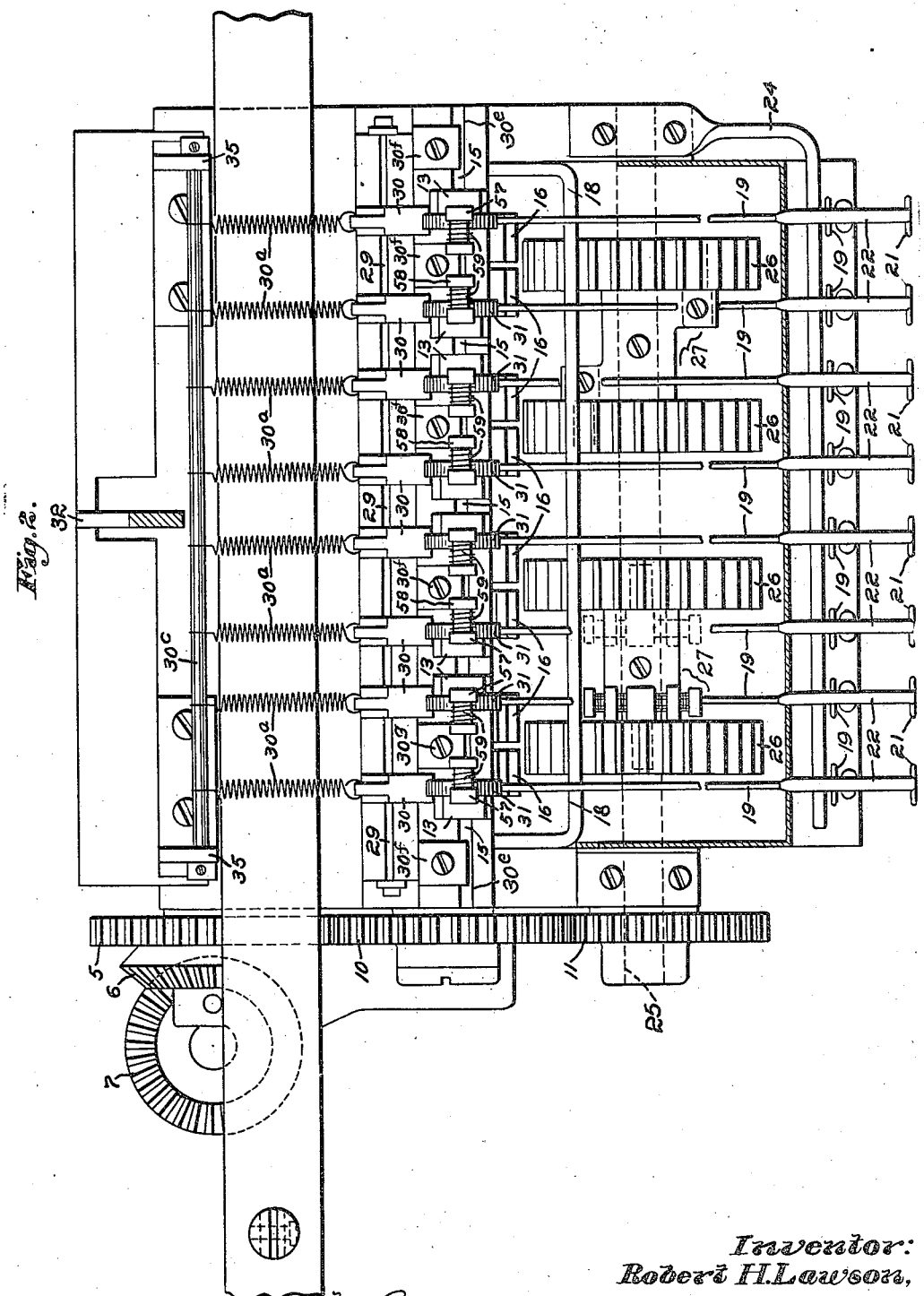

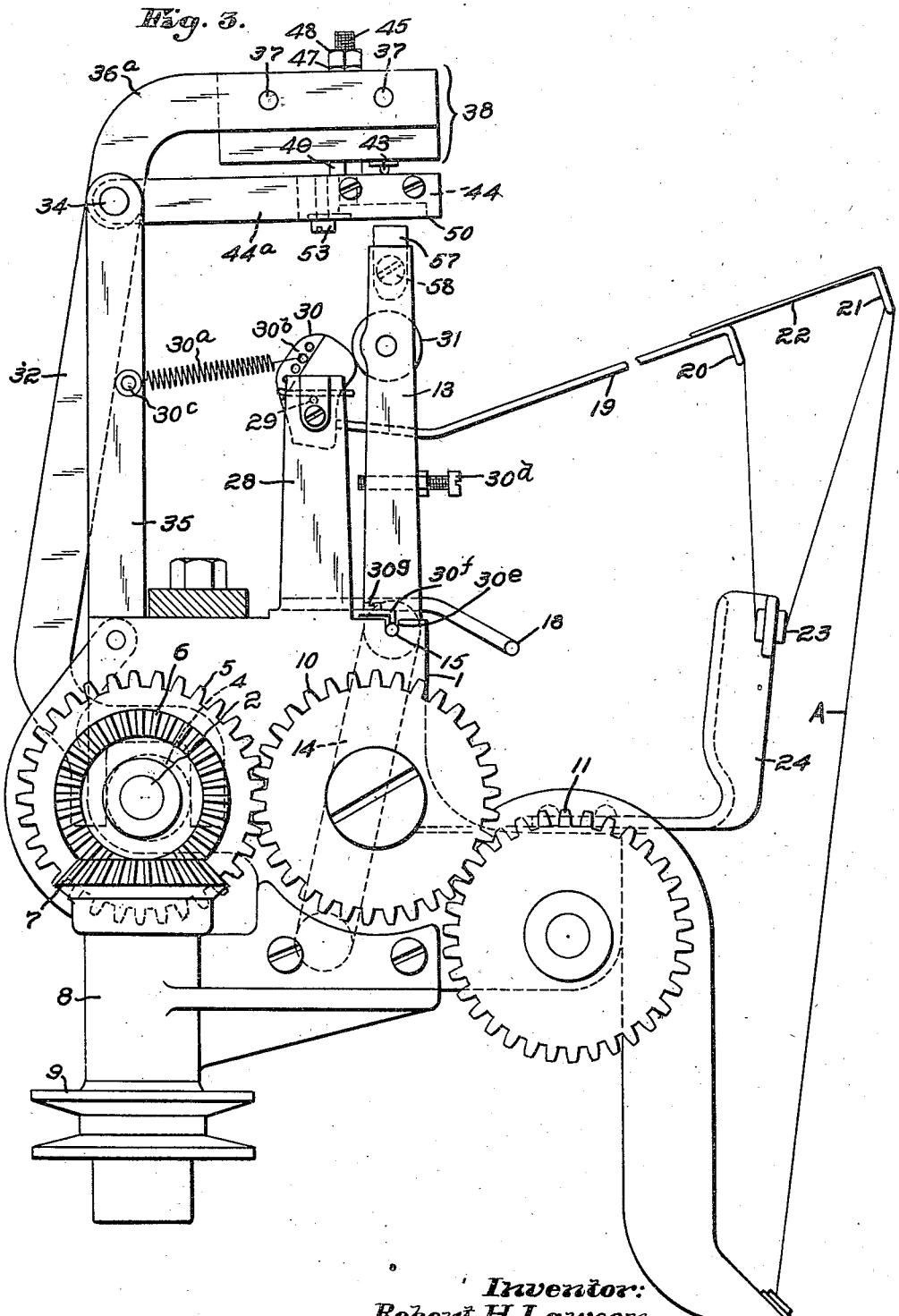

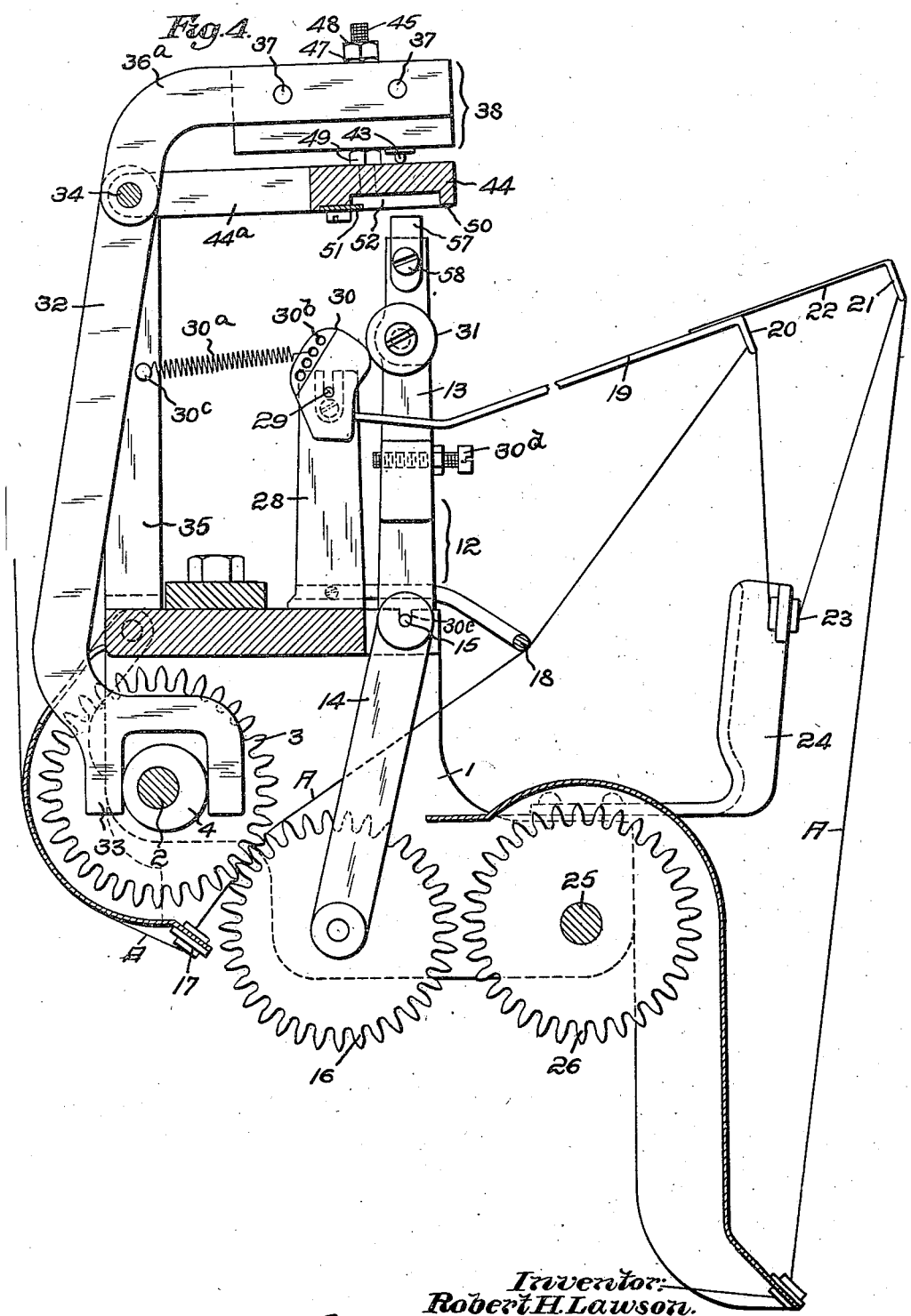

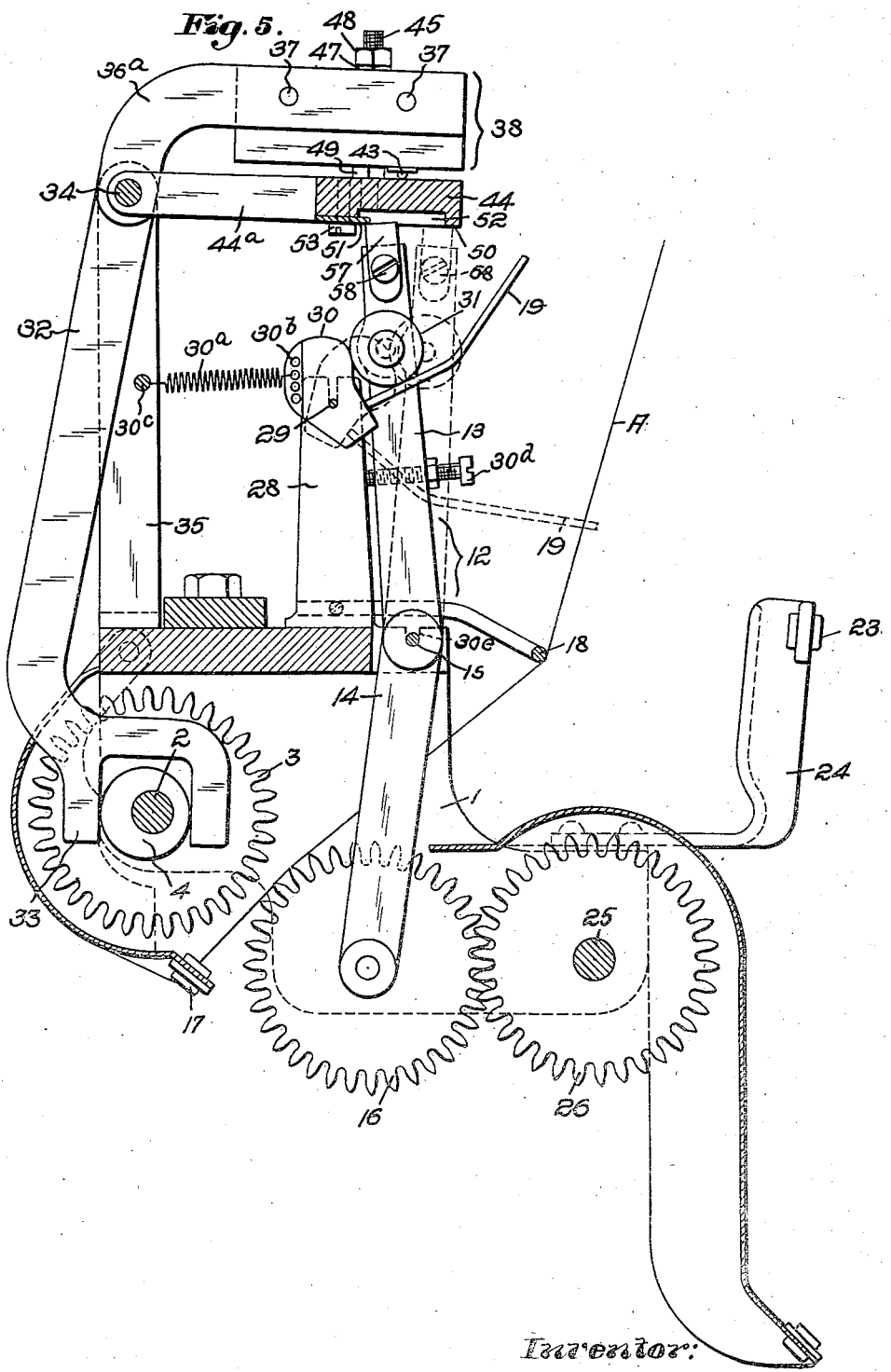

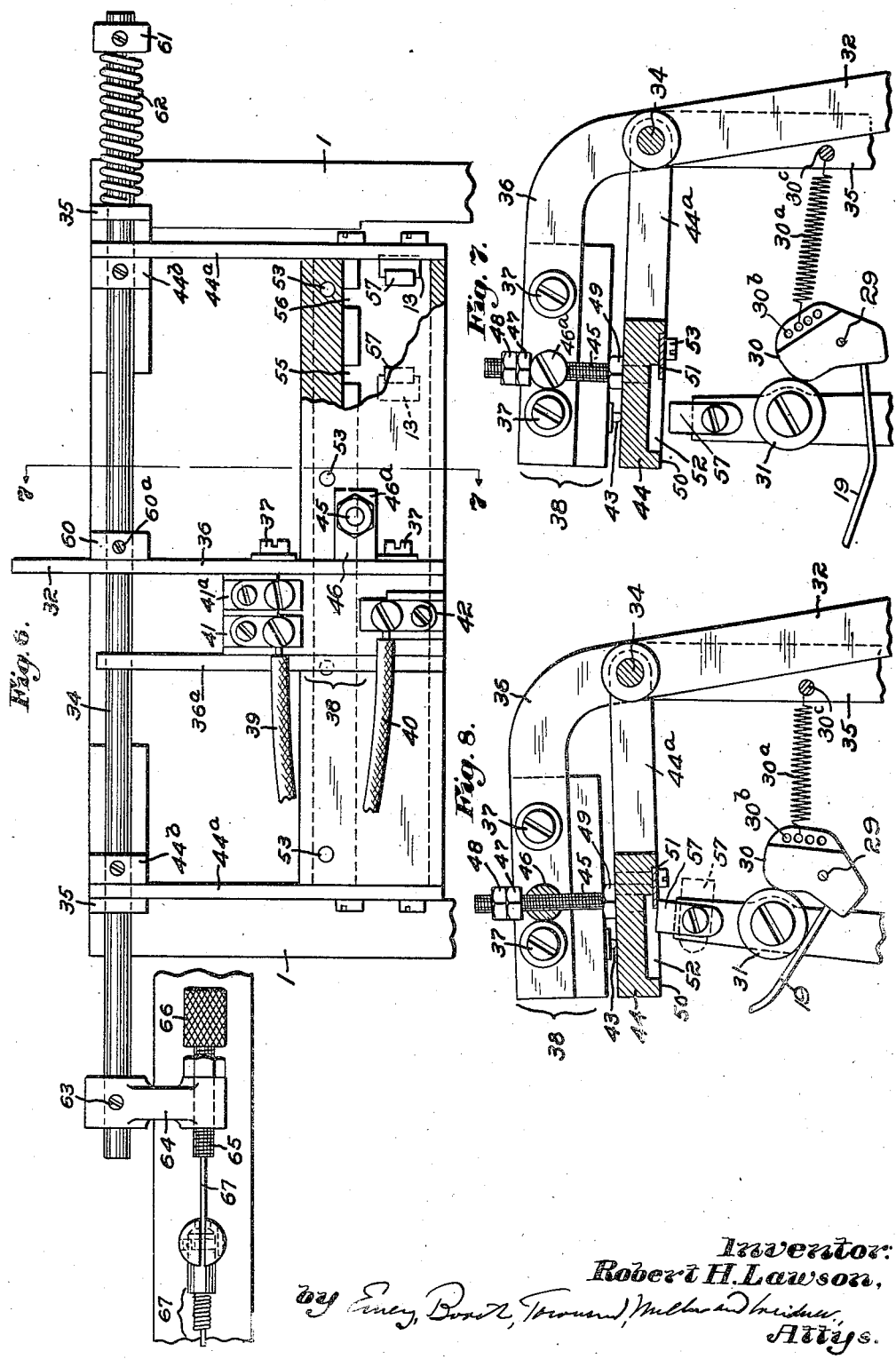

Aug. 25, 1942. R. H. LAWSON 2,293,838
SELECTIVE, MACHINE STOPPING MEANS, POSITIVELY OPERATED UPON YARN
CESSATION IN YARN-CHANGING FURNISHING MECHANISM
Filed April 3, 1941 8 Sheets-Sheet 8
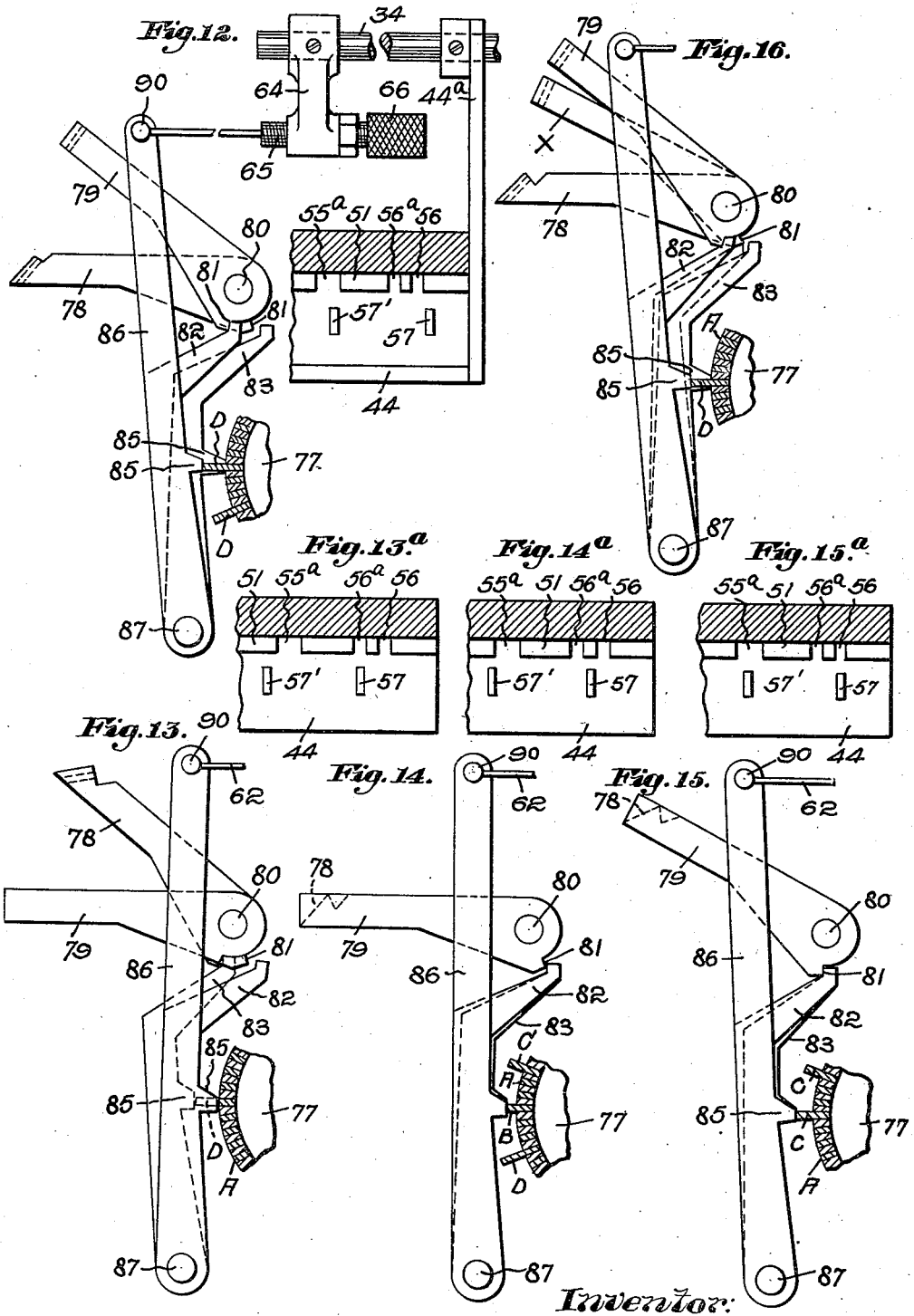
Inventor:
Robert H. Lawson.
by Emery, Booth, Towne, Miller and Waite Attys.

Patented Aug. 25, 1942

2,293,838

UNITED STATES PATENT OFFICE 2,293,838

SELECTIVE MACHINE STOPPING MEANS POSITIVELY OPERATED UPON YARN CESSATION IN YARN-CHANGING FURNISHING MECHANISM

Robert H. Lawson, Lakeport, N. H., assignor to Lawson Products, Inc., Pawtucket, R. I., a corporation of Rhode Island Application April 3, 1941, Serial No. 386,700

76 Claims. (Cl. 66—132)

This application is a continuation as to common subject matter of my co-pending application, Ser. No. 281,547, filed June 28, 1939, now Patent No. 2,247,244, and Ser. No. 315,391, filed January 24, 1940, now Patent No. 2,247,245, and this invention is an improvement upon but not limited to the constructions therein disclosed, and is in part concerned with and covers subject matter generically disclosed in said application Ser. No. 315,391, now Patent No. 2,247,245, but not therein claimed.

This invention particularly relates to improved means, preferably positively operated, for stopping the machine to which the invention is applied, in the event of unintentional cessation in or stoppage or breakage of the yarn or other strand employed, or because of an obstruction in the delivery of the yarn or strand anywhere in its course to the point of use; it also relates to means for selectively rendering inoperative the stop motion means pertaining to any strand or yarn employed without thereby stopping the machine, and therefore this invention is peculiarly applicable for use with yarn or strand-changing mechanism. Other features and purposes of the invention will be referred to hereinafter.

The invention, broadly considered, relates to strand feed-controlled mechanism for textile and other machines receiving and acting upon strands. It is, however, particularly applicable to controlling the feed of yarns, threads or other strands to the needles of knitting machines, and without limiting my invention to such manner of use, I will particularly describe and disclose the selected embodiment of my invention as used to control the feed of yarns, preferably selectively or pattern controlled, to a knitting machine which may, for example, be a circular knitting machine having a plurality of knitting stations, such as a circular body machine, or it may be a hosiery machine or any other knitting machine, straight or circular, but is not limited thereto.

While the yarn feeding or furnishing mechanism may be of any suitable type, I have chosen, without limiting my invention thereto, to disclose the same as applied to or used in conjunction with the particular type of strand feed-controlling mechanism disclosed in my said co-pending application Ser. No. 315,391, now Patent No. 2,247,245.

In order that the principle of the invention may be readily understood, I have disclosed a single embodiment thereof in the accompanying drawings, wherein Fig. 1 is a front elevation of the selected embodiment of the invention, representing the same as controlling the feed of eight different strands to four feeding stations of a circular knitting machine of the so-called "body" fabric type;

Fig. 2 is a top plan view of the mechanism shown in Fig. 1;

Fig. 3 is a left hand end elevation of the said mechanism;

Fig. 4 is a vertical section showing the furnishing wheels or feeding gear train with the yarn-control take-up and the stopping means cooperating therewith;

Fig. 5 is a vertical sectional view similar to Fig. 4 but showing a different relation of such furnishing wheels;

Fig. 6 is a detail in plan view disclosing the selective control of the stop motion, acting in synchronism with yarn changing mechanism at a knitting station of the machine;

Fig. 7 is a detail in vertical section of certain parts of the stop motion mechanism, the position thereof being that maintained while the yarn is intact and properly feeding;

Fig. 8 is a view similar to Fig. 7, but representing the position of the parts when the yarn breaks;

Fig. 9 is a side elevation of one type of yarn changing mechanism operatively connected and synchronizing with the stop motion mechanism;

Fig. 10 is a view partly in side elevation and partly in vertical section of a detail of the mechanism shown in Fig. 9;

Fig. 11 is a right hand inside view of Fig. 10 looking outward.

Fig. 12 is a view generally similar to Fig. 10, but of another embodiment of the means for the selective control of the stop motion when employing two yarn fingers;

Figs. 13, 14 and 15 are similar views representing a part of the stop motion means in several selective positions;

Figs. 13a, 14a and 15a are details in plan showing the position of parts in Figs. 13, 14 and 15, respectively; and Fig. 16 is a detail in side elevation indicating the use selectively of three yarns at a single station.

Without limiting my invention thereto, I will particularly describe the same with respect to the controlled feeding of a yarn or yarns to a knitting machine.

There have been numerous attempts in the prior art to provide means for positively feeding a yarn or yarns to the needles of a knitting machine, to stop the machine in the event of yarn breakage and to maintain a substantially uniform tension upon the yarn or yarns. The requirements in actual practice are, however, so exacting that heretofore so far as I am aware no entirely satisfactory mechanism has been provided to meet all the demands and conditions arising.

The inventions disclosed in my said patents set forth what I believe to be the most efficient type of yarn furnishing mechanism, and without limiting my invention for use in cooperation with or as a co-acting part of the yarn furnishing mechanism shown in said patents, I will, in order fully to disclose and make clear the practice and use of my invention, show the same as associated with and forming a synchronizing part of the particular type of yarn furnishing mechanism set forth in my said Patent No. 2,247,245.

Before more specifically referring to such disclosed type of yarn furnishing mechanism, selected merely by way of example, it is to be noted that I employ for each feeding station of the knitting machine (grouping the sets if desired) a set of rotary, toothed, interengaging members or gears acting to feed a strand or strands between them, one of said members or gears being driven from a driven part of the machine, and the other member or gear being bodily movable into and out of strand-feeding relation thereto, or into deeper or less deep meshing relation therewith, so as to control the strand or yarn feeding in accordance with the machine stress or demand upon the yarn, and which said other member or gear I preferably term a floating furnishing gear. I preferably also, as disclosed in my said Patent No. 2,247,245, but without limiting myself thereto, employ a motion-maintaining member or gear driven at the same speed as the said driven member or gear of the strand feeding set of members or gears, and so positioned that when the said bodily movable or floating feeding member or gear is moved out of mesh or feeding relation to the said driven member or gear, the said bodily movable member or gear is instantly brought into mesh with the said motion-maintaining member or gear, so that the proper speed of the said bodily movable member or gear is maintained while it is out of strand feeding position and so that when it is moved back into strand feeding position or relation, it is traveling at the proper circumferential speed.

Desirably, also, as shown in both of said patents, I provide a strand or yarn control take-up or movable arm through a suitable eye formation of which the yarn passes, and which take-up or movable arm acts, preferably through a cam, upon a member that is preferably a lever and which itself carries the bodily movable or floating furnishing gear above referred to. To act in synchronization with such parts or their equivalents, I provide improved stop motion means, which, as will be set forth hereinafter, is operated by power positively without initial effort from the parts controlled by the yarn. In operating the stop motion, no force is applied to the said take-up or movable arm, which may be as light as will act or move with the yarn or strand. The stop motion is operated when called upon to do so, no matter how light a tension is placed on the yarn by the control take-up. The stop motion mechanism is therefore capable of stopping the machine when the yarn or strand is unintentionally stopped by obstruction at any place, and so far as I am aware this has never been successfully accomplished in the prior art. The stop motion mechanism herein disclosed will, because of its peculiar relation and cooperation with the yarn furnishing members and parts, stop the machine upon unintentional cessation of the yarn movement, as, for instance, when the yarn breaks at the needles or sticks in the yarn guide, quite apart from the breaking of the yarn at the stop motion itself. Moreover, the stop motion, as will be hereinafter set forth, adequately allows for and synchronizes with yarn changing, which has so far as I am aware never been successfully accomplished in association with yarn furnishing mechanism for positively feeding the yarns, the term "positively" being herein employed broadly to designate a furnishing device or mechanism capable of actually delivering yarn at varying rates, but not precluding some incidental slippage.

In certain attempts in the prior knitting art, a stop motion has been provided to operate on the yarn before the same enters a furnishing gear device, but under frequent conditions of operation such yarn would be left in the stop motion by reason of the fact of yarn breakage beyond or subsequent to the furnishing gears, so that the yarn would continue to be pulled by the furnishing gear device, although the machine could not use the same. In other attempts an extra take-up was provided with an eye at the end thereof through which the yarn passed; such extra take-up, however, required to be so balanced as not to drop when the yarn was feeding and yet to drop the instant there was no yarn or the yarn overfed. The said device therefore required that a definite minimum amount of tension be placed on the yarn by the control take-up, and in order to prevent the stop motion take-up from dropping improperly, the tension or pull must exist on the yarn as the yarn entered the control take-up. This necessitated that the friction on the yarn in the eye of the extra take-up, by no means negligible, must be overcome to hold up the stop motion. Otherwise the stop motion take-up would have of necessity been so light that it would not drop when the thread is broken. If such take-up were too heavy it would stop the machine when it should not have done so.

In certain other attempts of the prior knitting art, the construction was such that a slub of yarn, caught in the stop motion take-up, would allow the yarn to pass through the take-up for a while but under great tension, but pulling the control take-up to the lowest point of its movement, over-feeding the yarn and causing serious imperfections at the needles before the machine was actually stopped, as well as causing cuts in the fabric due to excess tension on the yarn while it did continue to knit.

All these objections and other conditions and requirements are met by the stop motion herein disclosed, which, as already stated, is rendered operative by the control take-up itself, but without applying any force to the said control take-up, which stop motion will function no matter if only a very light tension be placed on the yarn by the said control take-up.

I will first, without limiting myself thereto, sufficiently describe a unit of the yarn furnishing mechanism, which may be applied to numerous types of knitting machines but which is herein represented as applied to a body machine of the Scott & Williams type.

The furnishing mechanism, which is composed of comparatively few and light parts, compactly assembled, may be mounted at any suitable position upon the machine in question, as, for example, upon a stationary part of a circular knitting machine, such as a body machine or a hosiery machine. According to the yarn feeding requirements of the machine, one or more units of the yarn furnishing mechanism may be mounted upon the same machine.

Power is taken for the strand feed controlling or furnishing mechanism directly from the driving means of the knitting machine or otherwise. A part of the framing, casting or support of the furnishing mechanism is indicated at 1, in the several views. Therein is suitably mounted a shaft 2 receiving power in any suitable manner from the main driving shaft of the machine, as, for example, by band or rope drive means such as disclosed in my said Patent No. 2,247,245 or otherwise, my invention being not limited in this respect. The said shaft 2 is mounted in suitable bearings in a bracket, casting or other part of the machine, and has fast thereon a toothed wheel, gear or rotary member 3 termed the driven feeding member or gear, or a plurality thereof, as, for example, four, as shown in Figs. 1 and 2, to provide for two yarns, selectively, at each of four feeding stations of the machine. Each such wheel or rotary member 3 may feed a single yarn or strand, or it may be of sufficient width to feed two or more separated strands. Also fast upon the shaft 2 is a very rapidly rotating cam or eccentric 4 (best shown in Figs. 3, 4 and 5), a toothed wheel or gear 5 (best shown in Fig. 3), and a beveled gear 6, which latter is in mesh with and driven by a beveled gear 7 upon a stud shaft supported in the bearing 8. In the several figures is also shown a pulley 9 for driving the shaft in bearing 8 having the beveled gear 7. Such driving may be effected in any suitable manner, as by means of a band or rope, above referred to, and as shown in my said Patent No. 2,247,245.

The gears or furnishing wheels 3 and gear 5 travel at precisely the same angular speed, and they may have any diameter and number of teeth. Preferably the said feed gears are metal, but the driving gear or train of gears, of which the gear 5 is one, may, if desired, be of some light, non-metallic material.

The said gear 5 that is fast on the shaft 2 and constitutes a part of the driving train, meshes, as shown in Fig. 3, with an idler gear 10 which itself meshes with a gear 11, said gears 10 and 11 being suitably mounted in the casing or part receiving the shaft 2 with its several gears. The gears 5 and 11 must be in the same ratio to each other as the feed gears 3 and motion maintaining gears 26 are to each other. The idler gear 10 may be of any convenient diameter.

The casting or part, wherein the said several gears are received or mounted, is so shaped or formed as to receive a series of parallel members, preferably levers, of the general character shown in my said patents, although my invention is not limited to the use thereof. The number of the said members or levers depends, of course, upon the number of yarns, there being one such member or lever for each yarn, but for the purpose of disclosing my invention and the application thereof, I have represented eight arms or levers 12, best shown in Fig. 1. For convenience of description, I will refer to the said levers 12 as each having an upper arm 13 and a lower arm 14, as shown in Figs. 3, 4, etc., and each such lever is pivoted upon a rod at 15, preferably in the general manner shown in my said Patent No. 2,247,245. Upon the lower end of the arm 14 of each lever 12 is loosely mounted a toothed wheel, gear or rotary furnishing member 16, the teeth whereof are similar in general form to the teeth of each rotary gear or member 3, and desirably the said several gears or furnishing members 16 are of the same material as the rotary gears 3, being preferably metallic. I refer to the several gears 16 as the co-acting feeding gears or co-acting feeding members, and it will be understood that in the disclosed embodiment of my invention, said gears 16 are not driven excepting thrugh their meshing relation with the respective gears 3, though the motion of said gears 16 is maintained when out of meshing relation with the gear 3, desirably in the manner shown in my said Patent No. 2,247,245.

It is not necessary that the gear or gears 16 be of the same diameter or number of teeth as the gear 3, or as the motion maintaining gear yet to be described, but it is essential, in the disclosed embodiment of the application of my invention, that as to circumferential speed the motion maintaining gear be identical with the gear 3.

Not necessarily, but preferably, and as shown in my said Patent No. 2,247,245, two levers 12 are or may be mounted as shown in Fig. 1 hereof, at the two sides of each set of feeding gears or furnishing members, and as four such sets are shown in Fig. 1, there are eight such levers 12 shown in said Fig. 1. If desired, a different number of levers 12 may be provided, and if only one strand is to be fed, only a single lever 12 is provided. Viewing the entire mechanism in plan or as though at a horizontal section above the gear train, or, as indicated in front elevation Fig. 1, it will be seen that there are, in the disclosed unit (composed or four sets), four wide gears 3 with each of which mesh two narrower gears or furnishing wheels or members 16, and with both of which gears, wheels or members 16 there meshes a single motion-maintaining gear of narrower width. As shown especially in Fig. 1, the gears, rotary members or furnishing wheels 16 are mounted as to each pair side by side in slightly spaced relation, so as to have an inter-engaging relation with the teeth of the rotary gear, furnishing wheel or member 3. If, as is here the case, more than two strands are to be fed through a single unit, a corresponding number of levers 12 will be provided, and if only one strand is to be fed, a single lever 12 is provided. The particular illustration is for illustrative purposes only and does not constitute a limitation upon my invention.

It will be noted, viewing the several figures and particularly Figs. 3, 4 and 5, that each toothed gear or member 16 is so supported by its lever 12 from its pivotal point 15, which is directly above such toothed gear 16, that each such toothed gear or rotary member 16 has in action a very sensitive pendulum-like movement upon its pivotal point of suspension. Each such toothed gear or rotary member 16, by reason of the lever 12 thereof, has a capacity to respond entirely freely and unrestrainedly to the stress of the strand or strands pertaining thereto. Of course, when there is absolutely no variation in the stress of the strand, there is no swinging movement of the corresponding lever 12, but each such lever 12 is entirely free to respond to any change in stress of or machine demand upon the strand, as obviously the movement of the control take-up or yarn feed or member yet to be referred to, moves the cam pertaining thereto and the corresponding lever 12 is entirely free to follow that movement of the cam, as in my said Patent No. 2,247,245. The particular means for pivotally mounting each lever 12 may be as disclosed in said Patent No. 2,247,245, or any other suitable means may be provided.

Merely for convenience of description, I will refer to the course of a single strand or yarn A, but it is to be understood that the number of strands depends entirely upon the requirement of the particular machine, and that the course of all the strands is desirably the same or similar.

It will be assumed that the strand A, indicated particularly in Figs. 3 and 4, is fed to the needles of the knitting machine from a suitable source, as, for example, a bobbin. Such strand passes directly or indirectly to a fixed strand receiving guide arm 17, best shown in Fig. 4, suitably secured to the casting or bracket there shown. The yarn or strand A is received between the teeth of the feeding gears or furnishing wheels 3, 16, pertaining thereto and then continues upward past and in contact with a stationary guide rod or bar 18 to a movable control take-up or guide arm or wire 19 having a suitable yarn eye 20 and desirably also having a second eye 21 which is itself formed or provided at the end of a relatively narrow flat spring member 22, which member 22 provides a shock absorber action between the said yarn or strand and the knitting mechanism, so that sudden changes in the yarn demand do not cause as much shock to the yarn as would otherwise be the case. This construction is particularly useful in float thread or other selective knitting and also with winding. The said spring 22 is desirably soldered or otherwise secured to the upper side of the body of the take-up arm or wire 19.

After passing through the eye 20, the yarn or strand next passes downwardly through a stationary eye 23 in an arm or bracket 24 supported upon the framing or casting, and then passes upward through the said eye 21 of the shock absorbing spring member 22, and then down to the needles.

In addition to the two furnishing wheels or gears 3 and 16, I also desirably provide, as disclosed in my said Patent No. 2,247,245 and preferably driven in the same manner as therein shown, upon a shaft 25 a gear 26, which gear 26 is so positioned and is of such width that it may be engaged by either, or it may be by both of the gears 16 of the set, when either such gear 16 is swung upon its lever 12 out of meshing relation with the related driven gear 3.

The said gear 26 is preferably metallic and has the same circumferential speed as the gear 3 and is driven through the driving train of gears 5, 10, 11. The gears 3 and 26 are of identical diameter and number of teeth, but the gear 16, as already stated, may be of a different diameter and number of teeth.

The said gear 26 is a motion-maintaining or non-feeding receiving gear. It maintains the motion exactly of the feed gear or gears 16 when moved out of feeding relation to the companion driven feed gear 3. It receives in a meshing relation whatever gear 16 of its set is at the time moved out of meshing relation with the gear 3, and maintains the motion of such gear 16 at precisely the same circumferential speed as when in mesh with the driven gear 3. As pointed out in my said Patent No. 2,247,245, it is possible to feed and control the strand even though the teeth of the two gears 3 and 16 are slightly separated, inasmuch as such gear 16 is or may be in mesh with the speed-maintaining gear 26. The exact position of the gear 26 with relation to the feeding position of the gear or gears 16 may be as disclosed in my said Patent No. 2,247,245, and the gears or members of the entire set 3, 16, 26 are very delicately circumferentially adjusted to prevent the tops of the teeth of opposing gears coming together and cutting with hammer-like blows the strand which, when properly fed, passes in a fluted, sinuous or wave-like manner between the gears 3 and 16. Therefore, suitable circumferential adjusting means may be provided for the gears, as indicated generally at 27, 27 in Fig. 2, in a manner not herein necessary more fully to describe.

Each of the strand-receiving control guide arms or control take-ups 19 is supported for movement to and fro consequent upon comparatively slight variations in the machine demand of the strand or yarn pertaining thereto, but with the capacity for greater movement in the event of strand discontinuance or strand breakage or undue demand of the strand, or in the event of such excessive feeding of the strand to the needles as would result in the stoppage of the knitting mechanism. Each such control take-up may be as light as will operate on the yarn because it does not in my invention have force applied thereto to operate the stop motion.

For the purposes of my invention, I preferably but without limiting myself thereto, provide means generally similar to that disclosed in my said Patent No. 2,247,245, and to that end I have represented one or a suitable number of upstanding arms or standards 28, shown particularly in Figs. 3 and 4. Upon such part or parts 28 is pivoted at 29 a cam member 30 for each control take-up 19, the functioning surface whereof is shaped preferably as indicated in Figs. 3 and 4, being for the same general purpose as the generally similar shaped cam of my said Patent No. 2,247,245. Each strand receiving guide arm or control take-up 19 is fixedly connected to the respective cam member 30, so that there are as many guiding arms or control take-ups 19 and cam members 30 as there are strands being fed to the knitting mechanism.

If desired and as shown in Figs. 2, 3, 4, etc., I may provide for each cam member 30 a light coiled spring 30a, connected at one end, for slightly varying the action thereof, to any one of a series of holes 30b in the cam member 30, and at the other end to a horizontal rod 30c, best shown in Fig. 2 as supported between two suitable uprights. The said springs 30a are very delicate and do not affect the very delicate action of the control take-ups or guide arms 19, as their purpose is merely to neutralize any effect which the weight of the cam members 30 might unduly have in resisting their proper movement as imparted or imposed by the very sensitive movements of the control take-ups or guide arms 19.

As shown in Figs. 3, 4, etc., each of the lever arms 13 is provided with a stop screw 30d, which may be adjusted so as to contact at the right time with an edge of the standard or upright 28 to prevent over-movement of said levers 12. As already stated, the said levers 12 are supported upon a suitable set of rods 15, which desirably rest in respective sockets 30e in the framing or casting and are held therein by suitable spring-like clips 30f, themselves held in place by screws 30g.

The upper arm 13 of each lever 12 near the extreme upper end thereof is shown as provided with a roll 31 bearing lightly upon the cam surface of the corresponding cam member 30. In the event of slight but not excessive changes in the strand tension or stress, and such as may normally very frequently occur, the corresponding guide arm or control take-up 19, in the event that the change is a slight increase in the tension, is drawn slightly downward and the corresponding cam member 30 is correspondingly slightly rocked in a clockwise direction viewing Figs. 3 and 4. Such slight clockwise movement causes a slight outward movement of the upper end of the arm 13 of the lever 12 with corresponding slight inward movement of the arm 14 of said lever 12, thus moving the teeth of the corresponding wheel, gear or rotary member 16 into deeper interengaging or meshing relation with the teeth of the wheel, gear or rotary member 3, thereby slightly increasing the feed of the strand in question and relieving the undue tension.

In the event that said slight change in the strand tension or demand is a diminution, the guide arm or control take-up 19 will move slightly upward and consequently the cam member 30 will move slightly in a contraclockwise direction viewing Figs. 3 and 4, with such consequent movement of the lever 12 as to withdraw the teeth of the gear, wheel or rotary member 16 slightly outward with respect to the teeth of the gear, wheel or rotary member 3. This will cause slower feeding of the strand in question and so permit the corresponding guide arm or control take-up 19 to resume its normal position.

Still referring only to the disclosed embodiment of the application of my invention selected for illustration, to which I am not limited, the movement of any toothed gear, wheel or member 16 into deeper or less deep meshing relation with the toothed gear, wheel or member 3 is facilitated by the exceedingly sensitive pendulum mounting of each lever 12.

Therefore, the said rotary members 3 and 16 with their teeth or tooth-like formations, constitute, just as in my said Patent No. 2,247,245, a new or secondary or rectified source of supply in a condition of uniform tension of the strand or strands of the knitting machine or other mechanism where the strand or strands is or are used, notwithstanding that the strand or strands between the original spool or bobbin or other supply is or may be in a condition of constantly changing tension, owing to numerous possible causes, such as imperfect winding upon the original package or the position of such package as the strand is being withdrawn therefrom.

The result of the described construction is that each strand issues from the outgoing side of the gears, wheels or rotary members 3 and 16 in a condition of uniform tension, and is delivered to the knitting machine or other mechanism in such condition of uniform tension. Thus, said wheels or rotary members act to provide a source of supply which is, in a sense, independent of the primary or original source of supply of the strand or the condition thereof as to tension, in that the substituted or new source of supply does not have the inequalities of tension of the original source of supply. Such substitute source of supply, as disclosed in my said Patent No. 2,247,245, controls completely the tension of the strand independently of the original source of supply in that it is not affected by the inequalities of tension of such original supply. Those inequalities of tension of the original supply are not permitted to impose themselves upon or to impair the essentially uniform tension that exists between the outgoing side of the gears, wheels or rotary members 3, 16 and the knitting machine or other mechanism that receives the said strand or strands.

Thus far the mechanism, which, as to this selected embodiment thereof, is quite similar to that shown in my said Patent No. 2,247,245, has been described as means for correcting or compensating for or rectifying slight irregularities that occur in the strand feed, this being accomplished by causing each strand to take a more or less sinuous course between the teeth of the gears, wheels or rotary members 3, 16.

My invention, however, is more particularly concerned with cooperating means for stopping the knitting mechanism when the strand or yarn breaks or when the strand or yarn becomes caught as through a slub catching in the take-up eye 20 or 21 or yarn fingers 78, 79, yet to be referred to, or from other cause, and my invention is also particularly concerned with providing for yarn change according to the dictates of the pattern mechanism, which yarn change, while it would cause such movement of the corresponding guide arm or control take-up 19 as otherwise would stop the machine, is prevented from stopping the machine because the yarn changing mechanism or parts thereof are under the synchronizing control of pattern means, as, for example, the drum operating the yarn levers or in some other suitable manner.

In my said Patents Nos. 2,247,244 and 2,247,245, of which this application is a continuation as to common subject-matter, I have disclosed, and in the earlier filed of said two patents I have claimed, means for stopping the machine under certain conditions, and therein the machine was stopped when the proper feeding of a yarn was unintentionally stopped by obstruction at any place, but the stopping means was directly acted upon through pull upon the control take-up arm, and therefore the yarn tension or stress upon such control take-up arm must of necessity have been strong enough to initiate the stop motion action through the act of operating the electric switch therein shown.

As already pointed out, an exceedingly important feature of the present invention is the provision of stop motion means that, in being caused to function, applies no force nor causes any force to be applied to the control take-up or guide arm for the yarn. The accomplishment of such purpose permits the use of as light a control take-up arm or member as will itself operate upon the yarn and serve to maintain a uniform feed thereof in accordance with varying machine demands.

For this and for other reasons, I provide means which is constantly and rapidly operating during the operation of the machine and which is in the general nature of a mechanical feeler or tester to ascertain whether a condition has occurred requiring stopping the machine, such as yarn breakage or unintentional stoppage of a yarn by obstruction at any place. In conjunction with or as a part of such feeler or testing mechanism, I preferably provide electrical means which itself causes the stopping of the knitting machine or other machine to which the invention is applied, though within the scope of my invention other than electrical means may be employed.

I will, without limiting my invention thereto, next describe the preferred embodiment of mechanism for accomplishing this purpose, and which is synchronized and coordinated in position or in capacity and time for functioning with the yarn changing mechanism of the machine (which mechanism may be of any suitable type), so that the mere changing of a yarn or yarns will not cause the machine to stop because of the fact of temporary cessation or permanent cessation of a withdrawn intact yarn.

Referring to the selected example or embodiment of this feature of my invention, I utilize the lever 32, having the forked lower end 33 to ride upon the cam or eccentric 4 on the shaft 2. The said lever 32 is pivoted, as more fully set forth hereinafter, fast upon a long, horizontal rod 34 at the upper ends of suitably spaced arms or uprights 35 extending upwardly from the bracket, casting or part whereupon the yarn furnishing unit is supported. The upper arm 36 of the lever 32 is bent or formed into a horizontal portion, as shown in Figs. 3, 4, 7, 8, etc., and has secured thereto between the said arm 36 and a subsidiary arm 36a, as indicated in plan view Fig. 6, and in any suitable manner as by through screws 37, an electric switch 38 which is desirably but not necessarily a switch known in the art as a MU switch, more fully disclosed in the patent to Henry G. Leupold, No. 1,780,758, dated November 4, 1930, and which switch requires an exceedingly short movement for its operation. Leading from terminals of the said switch 38 are circuit wires 39, 40, and the said wires may be so connected to terminals of the switch 38 as to cause the desired electrical change in the circuit to occur either upon opening of the switch or upon closing of the switch, as will be understood by those skilled in the art. The alternative connections for the circuit wires are indicated in Fig. 6 at 41, 41a and 42, and in any case the switch is caused to function and to operate the circuit by movement of the axially movable operating button or plunger 43. As stated, only an exceedingly slight longitudinal movement of said button or plunger 43 is required to cause the necessary change in the circuit and consequently the operation of the stop mechanism of the knitting or other machine to which my invention is applied.

It will be understood that the very rapid rotation of the cam or eccentric 4 fast on shaft 2, whose speed of rotation is sufficiently high to drive the furnishing gears at their proper yarn-feeding speed, imparts very rapid vibratory or to and fro feeling or testing motions to the lever 32 and consequently to the switch 38 carried thereby.

Also pivotally mounted upon the horizontal rod 34, but with capacity for slight relative movement with respect to lever arm 36, is a member 44 which, for the purpose of description, I term a plate and which is carried by two arms 44a, 44a loosely, pivotally mounted in the spaced relation shown upon said rod 34, being held in such spaced relation by two collars 44b, 44b fast upon said rod 34. The said member or plate 44 is thus held in a position directly under and in very close relation to the said MU or other switch 38, and in fact so close that the operating button or plunger 43 of the said switch may or actually does rest upon said plate 44, but not so as to cause a functioning movement of said operating button or plunger 43, except as hereinafter stated.

It is necessary to prevent undue relative motion, but to provide for a very slight functioning motion between the lever arm 36 carrying the switch 38 and the plate 44. This is accomplished in the disclosed embodiment of my invention by the provision of a screw 45 tapped or fixed in an upright position in the said plate 44 so as to extend upward in parallelism with and close to the side of the switch 38. The said screw 45 extends freely through a transverse passage in another screw or pin 46 extending laterally from the said switch 38, the head whereof is shown at 46ᵃ in Figs. 1 and 7. Above the said screw or pin 46 upon the screw 45 are provided as motion-limiting means a nut 47 and a lock nut 48, and a nut 49 is also provided at the upper face of the plate 44 to hold the screw 45 in fixed position.

The nuts 47, 48 are so positioned upon the screw 45 that in the feeling or testing operation referred to, if the related control take-up arm or arms is or are in a position or positions indicative of a satisfactory feeding condition of the yarn or yarns, there is no relative movement of the lever arm 36 and the plate 44, as is evident from Fig. 7, which is the relative position of the parts when the yarn or yarns is or are intact. If, however, a yarn has broken or a condition of a yarn has occurred which calls for a stopping of the machine, a relative movement, through means to be described, occurs with respect to the plate 44 and the lever arm 36 carrying the switch 38, and the screw 45 moves slightly upward through the other screw or pin 46, thus slightly elevating the nuts 47, 48 above the head of the screw 46, as shown in Fig. 8, which represents the condition of the parts when a yarn breaks or a condition thereof occurs calling for the stopping of the machine.

It will be understood that the plate 44 normally moves with the switch 38 because of the nuts 47, 48, but pressure against the said plate 44, encountered as will be described in the feeling or testing movement, causes the switch 38 to function—that is, to open or to close depending upon the electrical connections thereof, as has been explained. The said switch 38, as has been explained, is firmly secured to the upper lever arm 36 of the lever 32, which lever is very rapidly vibrated or moved to and fro by the cam or eccentric 4 on the driven shaft 2 of a unit of the furnishing mechanism.

The plate 44 has upon its under side two formations or ledges 50 and 51, which are suitably spaced apart, being provided at the opposite sides of a recess 52 of suitable extent in a direction lengthwise of the plate 44 to permit the carrying out of the function to be described with respect to whatever number of control take-up arms are provided in the furnishing unit. The ledge 50 is or may be integral with the body of the plate 44, but the ledge 51 is preferably removable, being removably held in place by a suitable number of screws 53 in a slightly countersunk portion of the said plate 44. The said ledge 51, as will be more fully referred to later, is shown, in this example of the invention, as provided with two transverse slots 55, 56 extending inward from the edge of said ledge 51 and positioned with desired relation to two of the levers 12, and the purpose of having the said ledge 51 removable is to permit the substitution of other ledges having a different arrangement or location of like slots, so as to function with other levers 12 pertaining to other control take-up arms of the unit.

A reference to Figs. 3, 4 and 5 shows that the said plate 44 is positioned directly over and close to the entire series of levers 12 of the furnishing unit, one of which levers 12 is, as has been fully explained, provided for each set of furnishing members or feeding gears.

It may be desired to render entirely inactive, temporarily or otherwise, the lever or levers 12 for one or more yarn furnishing sets, as in the event that one or more yarns is or are entirely discontinued at one or more of the feeding stations of the machine. In such case, the yarn or yarns that are discontinued should not be fed between the rotary gears or furnishing wheels 3 and 16 pertaining thereto. While this result may be accomplished in any suitable manner, I preferably provide the following means.

The upper end of each lever arm 13 of each lever 12 is provided with a finger or extension 57 constituting when in action an upward continuation of the corresponding lever arm 13. Each such finger 57 is pivotally mounted at or near the upper end of such lever arm 13 upon a pivotal screw 58 set in the side of the lever arm 13, as best shown in Fig. 1. A coiled spring 59 encircles each screw 58, so as to hold such finger 57 in either its active or its inactive position, to which it is manually moved by the operator. As shown in Fig. 1, the upper end of each finger 57 is of increased thickness, but any other suitable construction may be provided.

In order to make clear the action of the plate 44 upon the respective levers 12 of the furnishing unit, it is pointed out that Figs. 7 and 8 are taken from the opposite side of the furnishing mechanism unit from Figs. 3, 4 and 5, and that therefore the removable ledge 51 referred to as the back ledge, is shown at the left in Figs. 3, 4 and 5, and is shown at the right in Figs. 7 and 8. With this explanation, the operation of parts now to be set forth will be entirely clear.

The upper ends of the said levers 12 of the furnishing unit (including their fingers 57 when in functioning position) will not touch the plate 44 in the feeling or testing up and down movements of said plate 44 when the yarns are feeding properly (that is, when the very slight inevitable changes in the machine-demand or stress of the yarns causes slight movements of the control take-up arms 19), because at such time the extreme upper ends of all of said levers 12 will encounter only the recess 52, the depth of which is such that the vibratory feeling or testing movements of the plate 44 caused by the rapid rotation of the cam or eccentric 4, will not cause contact between the tops of any of said levers 12 and any part of the plate 44 nor its ledges. Such perfectly operating condition is that represented in Figs. 3, 4 and 7.

If, however, the position of any lever 12 is changed so as to bring the extreme upper end of such lever under either ledge 50 or 51, the plate 44 is consequently in the downward feeling or testing movement thereof prevented from completing its full downward movement of vibration, because of the abutment-like action of the upper end of a lever 12 with respect to the ledge 50 or the ledge 51, as the case may be. The consequence is that the operating button or plunger 43 of the switch 38 is moved lengthwise and the circuit thereof is changed through the action of the switch 38, whereupon the machine is stopped. When the plate 44 so encounters either ledge 50 or 51, the said plate 44 moves very slightly relatively to the lever arm 36 because of the provision of the screw 45 as already explained.

Such stopping action is a positive one occurring through the direct feeling or testing action of the plate 44, and is not initiated or carried out through any of the control take-up arms or guides 19, as was the case in my said Patents Nos. 2,247,244 and 2,247,245. It will be evident that in the construction herein disclosed, it is not necessary that there be any minimum or other amount of yarn tension or stress on the control take-up arms to cause the operation of the switch 38 and the stopping of the machine. On the contrary, in accordance with the present invention, no force whatever is applied to any of the control take-up arms 19 to operate the stop motion, and therefore, such control take-up arms may be as light and delicate as consistent with operation upon the yarns they respectively receive or handle, but nevertheless the stop motion will be operated at the proper times in a positive manner. Even though the control take-up arms are so light and delicate as to be barely sufficient to permit them to move to the top of their arc of movement, the construction herein disclosed will still permit the proper operation of the stop motion of the machine.

Referring more particularly to Figs. 7 and 8, it has been explained that when more yarn is needed at any furnishing set, the control take-up arm 19 pertaining thereto is pulled downward by the yarn thereof, thus forcing the floating gear or furnishing member 16 of that set into deeper mesh with the driven rotary gear or furnishing member 3 thereof, with the result of pulling and feeding more yarn. When, however, less yarn is needed at that furnishing set, the said control take-up arm 19 rises and the said floating gear 16 moves into shallower mesh with the said driven gear for furnishing member 3, thus feeding less yarn at that set. These conditions occur without causing the stop motion to operate because the dimensions of the recess 52 of the plate 44 are such that neither ledge 50 nor 51 of the plate 44 encounters the upper end of the lever 12 in question in the feeling or testing movements of said plate 44.

When, however, a yarn breaks, the control take-up arm 19 pertaining thereto flies up, so that the upper end of the corresponding lever 12 moves into a position directly under the back ledge 51, and in its downward feeling or testing movement of vibration, said ledge encounters the upper end of said lever 12, which thereupon acts as an abutment, and thus the interrupted vibratory movement of the plate 44 causes the switch 38 to function and the machine to stop.

If, on the contrary, the yarn, instead of breaking, becomes caught, as by means of a slub catching in the control take-up eye 20 or 21 pertaining to that yarn, or from other cause, the said control take-up arm 19 is pulled down, causing the corresponding lever 12 to move into a position directly under the front ledge 50. This will in the downward feeling or testing movement of the plate 44 cause the functioning of the switch 38 through the interruption of such downward movement, in the manner already described, and the machine will be stopped.

Still another condition may exist. For instance, a yarn may break or be cut by a faulty needle between the feeding guide and the needles. A tension or deposit of dirt or a slub may prevent the yarn from pulling away from the guide. In such case, the furnishing unit continues to furnish yarn which the machine is not using; thus the take-up 19 moves up, causing the stop motion to operate.

It will be understood that the stop motion is operated by power positively without initial effort from or by the parts controlled by the yarns or any of them.

The stop motion herein disclosed is therefore capable of stopping the machine when any of the feeding yarns is unintentionally stopped by obstruction at any place. The stop motion functions to stop the machine upon unintentional cessation of yarn movement of any feeding yarn, as, for example, when a yarn breaks at the needles or catches in a yarn guide, quite apart from the breaking of the yarn at or in close proximity to the furnishing mechanism or any part thereof.

In said Patent No. 2,247,244, there is disclosed and broadly claimed means for introducing and/or for withdrawing a yarn or yarns at the furnishing mechanism, the means therein disclosed being operated by additional cam means upon the cam member pertaining to the respective control take-up or guide arm. My said Patent No. 2,247,245 contains description of the use, with the mechanism claimed therein if desired, of like yarn introducing and/or yarn withdrawing mechanism. Such mechanism is not disclosed in the present application though the same may be used in association with the present invention if desired.

I do, however, in this application disclose and claim means for coordinating or synchronizing yarn change mechanism of the knitting machine at any station thereof with yarn furnishing mechanism, of which only one representative type or example is herein disclosed, so that in the event of a yarn change and the cessation, temporary or otherwise, of the feed of the withdrawn yarn, with the accordingly coordinated or synchronized unmeshing of the furnishing gears for the withdrawn yarn, the stop motion of the machine will not be operated. I thus coordinate and synchronize the action of yarn change means, yarn furnishing means and stop motion means, as will be more fully described, and it is to be understood that any suitable type of any of said means may be employed, just so that they are coordinated or synchronized in action.

In my said Patent No. 2,247,245, I described, without illustrating and therefore without ultimately claiming in said patent, means whereby, when the furnishing mechanism was to be used for feeding two or other plurality of strands or yarns, means would be employed, there referred to as a second switch, operated from or by the cam shaft of the knitting machine, so that the control take-up arm pertaining to the strand or yarn temporarily or otherwise removed from feeding relation, might move to an extreme position without, however, stopping the machine. The purpose of this present application is to disclose and to claim such subject matter generically, the herein selected embodiment of such means constituting an improvement upon the means so described in said Patent No. 2,247,245.

No claim is made in either of said Patents Nos. 2,247,244 and 2,247,245 to yarn changing means in any relation to furnishing mechanism, that being a purpose of the present application.

I will therefore proceed to the description of the selected embodiment of means for accomplishing the results referred to, without in any way limiting myself thereto, except as defined in the claims hereof.

I have stated that the particular back ledge 51 herein shown is provided with two slots 55, 56. In this embodiment of my invention, the remainder of the said ledge 51 has an unbroken free edge, but said back ledge 51 is removable so that other ledges having a different arrangement of slots for like purpose may be substituted therefor. As the parts are positioned in Fig. 6, it will be evident that the left hand lever 12 there shown is in line with the slot 55 but that the right hand lever 12 there shown is not in line with the slot 56. Therefore, with the parts positioned as shown in Fig. 6, the left hand lever 12 may move into or under the slot 55 and the stop motion will consequently not be operated from said left hand lever 12. Inasmuch as the slot 56 is not in line with the right hand lever 12, a movement of such right hand lever 12, so as to bring it under the back ledge 51, would result in stoppage of the machine, because in such case an unslotted part of the back ledge 51 will encounter, in the feeling or testing movement, the top end of said right hand lever 12 and so cause the operation of the switch 38 in the manner previously described.

In such condition of parts and in the example just given, it will be understood that the right hand lever 12 is functioning with a feeding yarn and that the yarn pertaining to the left hand lever 12 is out of action through the result of yarn change synchronized therewith. Although only two positions are shown, it will be readily understood that the plate 44 might within the scope and purpose of my invention be moved to three, four or more positions, in which case it could take care of three, four or more arrangements of striping levers instead of two. My invention is not limited in this respect.

My invention contemplates the provision, in the selected example, of any suitable means for changing the relation of the plate 44 with its said back ledge 51, coincidently and in coordination with rendering active the yarn pertaining to the left hand lever 12 and rendering inactive the yarn pertaining to the right hand lever 12. Of course, it will be understood that the described changing of two yarns is by way of example merely, and that more than two yarns may be used either together or in some alternation or grouping or variation, such as may occur in horizontal striping or in the use of floating yarns, or in the use of reinforcing or splicing yarns, or in many other cases of yarn variation or change. In fact, the invention is intended to be used and is capable of use with many different types of yarn changers of knitting machines, and any suitable means may be employed to coordinate the relation of and synchronize the movements of the yarn changing mechanism and the stop motion mechanism, and, through the latter, to control the action of the furnishing mechanism when a condition occurs that calls for the stopping of the machine.

For the purpose of rendering active, in the selected embodiment of the invention, either the left hand or the right hand lever 12, shown in Fig. 6, which levers represent two levers of one furnishing set, I have provided the following means, to which my invention is not limited.

The pivot 34 for the lever 32 with its arm 36 has been described as consisting of a sliding horizontal rod, best shown in Fig. 6. It is supported for slight longitudinal horizontal movement in the said two arms or uprights 35, previously referred to, and which extend upward from the bed portion of the framing or casting of the furnishing mechanism. The said upright lever arm 32 is fast upon the said rod 34, being held thereon by its hub 60 secured to the said rod by a set screw 60a. The construction is such that the axial or horizontal movement of the rod 34 is participated in by the lever 32 which may slide transversely of the cam or eccentric 4, the latter being of sufficient width to allow such movement, amounting in the present disclosure to substantially one-eighth inch per arrangement of levers. Not only is the lever 32 moved with the rod 34 but also all the parts carried by said lever 32 and its associated parts, including the switch 38 and the plate 44, having the ledges 50, 51 and the arms 36a, 44a, 44a.

The said rod 34 has fast upon the right hand end thereof, viewing Fig. 6, a collar 61, and between the same and the adjacent upright 35 from the framing of the furnishing mechanism is a coiled spring 62 of sufficient force or strength to return the said rod 34 and all parts carried thereby to its extreme right hand position (that is to say, the opposite to the position shown in Fig. 6). To the other end of the said rod 34 is fixedly secured by a screw 63 a sleeve-like bracket arm 64 which at its outer end receives an adjusting screw or member 65 without adjusting knob 66 pertaining to a Bowden wire connection 67, a portion of which is shown at the extreme left in Fig. 6 and in Fig. 1, and the other end of which is indicated at 68 at the upper right hand end of Fig. 9.

The Bowden wire connection indicated at its two ends as 67, 68 in Figs. 6 and 9, 10, respectively, is merely representative of many different operating connections that may be provided to effect coordination and synchronization of movement of yarn change means or mechanism and yarn furnishing means or mechanism.

In order sufficiently to disclose such coordination and synchronization of movement of yarn change means or mechanism and yarn furnishing means or mechanism of a knitting machine, I have illustrated in Figs. 9, 10 and 11 sufficient structure of a circular body knitting machine of the Scott & Williams type having thereon means to alternate in action two different yarns at one feeding station of the machine. It is to be understood that more than two yarns may be changed or varied in action at the station indicated or at any other station, and that the yarn change means indicated is merely by way of example, and that more than two yarns may be changed or varied according to pattern dictation for each of them.

In Fig. 9, the needle cylinder is indicated at 69 and the cam ring or cylinder at 70, the needle cylinder or carrier being rotated by means of a beveled gear ring, indicated at 71, and driven from a small beveled gear 72 fast upon the shaft 73 in the usual manner. Mounted upon a convenient part of the bed or support 73a for the needle cylinder or carrier 70 is the bracket or casting 74 for the yarn change mechanism which includes a stud shaft 75 having suitably mounted thereon a ratchet wheel 76 and a pattern drum, a small part of which is indicated at 77 in Fig. 10 and which is of sufficient width to act upon the several levers operating the yarn fingers, which may be more than two. The said drum 77 is provided with suitable formations such as replaceable, frangible tricks with a varying amount of radial projection, so that according to the location thereof and the dictates of the pattern which they constitute, they will act upon the levers for the yarn fingers and render them respectively active or inactive, in accordance with such dictates of such pattern mechanism. Any other suitable means may be employed so as to act upon any suitable number of yarn fingers, whether two or more, so that they will be rendered active or inactive in alternation or in variation or in any desired relation in any number.

If more than two yarn fingers are thus manipulated or rendered active and inactive, or if only two yarn fingers are rendered active and inactive in alternation or variation, the yarns that are supplied through said yarn fingers to the needles pass through the guide eyes of the respective control take-ups or guide arms 19 in the manner already described, and the back ledge 51 of the plate 44 will be provided with slots like 55, 56 that in the movement of the horizontal rod 34 with the plate 44 and other parts referred to as moving therewith, any yarn and all yarns that are temporarily or otherwise rendered inactive has its lever 12, or have their levers 12, moved into line with or underneath appropriate slots in the leading edge of the back ledge 51, so that in the feeling or testing movements of vibration of the plate 44, the machine is not stopped unless a feeding yarn breaks or such a condition thereof occurs, as already explained, as is sufficient to call for the stopping of the machine.

Thus the lengthwise movement of the plate 44 with the rod 34 constituting the pivot thereof will occur in perfect coordination with the act of rendering active or inactive any yarn fingers however many there may be. The rod 34 is capable of turning slightly and easily in its supports 35, 35, this movement being permitted by the coiled spring 62.

Merely by way of example, I have represented in Figs. 9, 10 and 11 two yarn fingers 78 and 79, the former being shown as active and the latter as inactive in the position shown in Figs. 9 and 10. The said yarn fingers 78, 79 are loosely mounted upon a pivotal rod or pin 80, and each such finger is provided with a shoulder or formation 81 at its under side to be engaged by the upper ends of the respective lever arms shown at 82, 83. In Fig. 10, the lever arm 82 is clearly shown as engaging the shoulder or formation 81 of the yarn finger 79, and so moving the said yarn finger 79 into inactive position, this being done by reason of the call of the pattern drum, as indicated by the radially longer trick 84, shown as having just engaged a cam portion 85 of the lever arm 86, thus moving it contraclockwise. In the construction shown, the lever arm 86, which is pivotally mounted on a suitable rod or the like 87, is made fast to the lever arm 82 by means of through pins 88, 88a and a spacing block 89, shown in Fig. 11, so that the said two pivotally mounted parts 82 and 86 always move together upon the pivotal rod 87. The lever arm 83, however, which also is provided with a cam projection 85 for operation when called upon by the pattern drum, is not connected to the lever arm 86, but is moved independently thereof upon said pivotal rod 87. Thus, each lever arm, and accordingly each yarn finger 78, 79, is moved in or out of knitting relation according to the call of the pattern drum 77.

When in the construction shown the yarn finger 79 is moved upward into non-feeding position, the lever arm 86 is moved to the left, viewing Figs. 9 and 10. The upper end of said lever arm 86 is connected at 90 to the end 68 of the Bowden wire which is supported in any suitable manner, as in a bracket 91 extending upward from the yarn change support.

The movement of the Bowden wire toward the left, viewing Figs. 9 and 10, is against the stress in a lengthwise direction of the coiled spring 62, shown in Fig. 6, so that when the lever arm 86 is permitted to move in a clockwise direction, viewing Fig. 10, the Bowden wire will be pulled by the coiled spring 62 toward the right, viewing Figs. 6 and 9. Thus, according to the two positions of the lever arm 86, the plate 44 will be moved to the right or to the left in a lengthwise direction viewing Fig. 6, so as to position the slots of the back ledge 51 in their proper positions as already described; that is, to bring a slot or slots in line with or over a lever 12 or levers 12 as the yarn or yarns pertaining thereto is or are rendered inactive, so that such act of rendering a yarn or yarns inactive will not stop the machine.

At preceding points in this specification it is definitely stated that I have, by my present invention, provided means for selectively rendering inoperative the stop motion means pertaining to any strand; that my invention is used to control the feed of yarns, preferably selectively or pattern controlled; that I disclose herein the selective control of the stop motion, acting in synchronism with yarn changing mechanism; and, at the beginning of the fourth paragraph from the end of this specification, I state that the "stop motion is selectively rendered ineffective as to any yarn or yarns—that is, it is selectively thrown out of operation as to any yarn when that yarn is intentionally discontinued by the machine."

Also at many preceding points in this specification, it is stated that the described changing of two yarns is by way of example merely "and that more than two yarns may be used either together or in some alternation or grouping or variation, such as may occur in horizontal striping or in the use of floating yarns, or in the use of reinforcing or splicing yarns, or in many other cases of yarn variation or change;" that more than two yarns may be changed or varied according to pattern dictation for each of them; that (referring to Figs. 9, 10 and 11) "any other suitable means may be employed so as to act upon any suitable number of yarn fingers, whether two or more, so that they will be rendered active or inactive in alternation or in variation, or in any desired relation in any number;" and in describing the plate 44, it is stated in substance that although only two positions are shown, it will be readily understood that the plate 44 may be moved to three, four or more positions, in which case it could take care of three, four or more arrangements of striping levers.

I have in Figs. 12 to 16 represented two further embodiments of my invention, both of which are fully predicated upon the said recited disclosures and other like disclosures in this specification. In the first of said two further embodiments, I have represented two yarn fingers or levers at a single station, which may be thrown into or out of action selectively—that is to say, both such yarns may be rendered active at the same time, or both inactive, or either active alone, and in the second of said two further embodiments I have represented three yarn fingers or levers which may be similarly rendered active or inactive in any arrangement or alternation in groups or singly, and I have in both said embodiments represented the plate 44 which, by pattern controlled means, is moved in synchronism with the movement of said yarn fingers or levers, thus rendering the stop motion of the knitting machine selectively ineffective as to any of said yarn or yarns. For this purpose, I preferably employ a pattern drum or trick wheel, such as 77 of Fig. 10, having tricks with several heights of butts, and at proper points lacking butts, as, for example, a lacking butt and three different heights of butts, so as by means obvious to those skilled in the trade to impart the necessary extent of longitudinal movements to said plate 44 at the proper times in effecting the described synchronization. For the purpose I may employ a lever moved by such butts of proper height on the pattern drum or trick wheel, of the general type shown in the patent to Page & Swinglehurst, Jr., No. 1,906,204, April 25, 1933, where a cam lever 825' is shown in Fig. 3 as resting on trick 810, and is particularly described on page 4, lines 89–95, of the specification thereof, said cam lever being used for a specifically different but generally analogous purpose to the use of a lever by me to move plate 44.

Referring now particularly to said Figs. 12 to 16, I have in Figs. 12 to 15a represented an embodiment of my invention employing two yarn fingers 78, 79 with the lengthwise moving plate 44 of the stop motion selectively rendered ineffective with respect to either of said yarns, and in Fig. 16 I have indicated three yarn fingers 78, 79 and X, which will cooperate with the said plate 44 in a similar selective manner.

In Figs. 12 to 15a, I have represented four possible positions of the yarn fingers 78, 79 as determined from the pattern drum or trick wheel 77. For the sake of clearness of description, I have, in each of Figs. 12, 13a, 14a, 15a, numbered the left hand finger or extension 57 as 57'. It will be understood that the finger or extension 57 pertains to the yarn finger or lever 78, and that finger or extension 57' pertains to yarn finger or lever 79, which would also be the case with the construction shown in Fig. 10, when considered with Figs. 6, 7, 8.

In Fig. 12, the yarn finger 78 is in action and the yarn finger 79 out of action; in Fig. 13 the yarn finger 79 is in action and the yarn finger 78 out of action; in Fig. 14 both said yarn fingers 78, 79 are in action; and in Fig. 15 both said fingers 78, 79 are out of action. In Figs. 12, 13a, 14a, 15a, I have represented the ledge 51 as having slots and solid portions to cooperate in the manner already described, with the yarn fingers 78, 79. In this embodiment of the invention, I have represented three slots 55a, 56 and 56a, and for convenience the slot 55a may be of double width as there indicated. The spacing of the slots is, of course, readily determined by the pattern requirements, as obvious to persons skilled in the art.

The pattern drum or trick wheel 77 is of the same construction and is mounted in the same manner as in Fig. 10, but instead of having among its tricks merely a single height of butt and no butt, suitably distributed according to pattern, I have provided for no butt, as indicated at A, and three progressively higher butts, indicated at B, C, D, to be arranged according to the desired pattern.

As shown in Fig. 12, the highest butt D engages the lever 86 and therefore throws the yarn finger 79 out of action, and inasmuch as no butt comes opposite lever 83, the yarn finger 78 is in action. In Fig. 13, a highest butt D engages lever 83, and therefore the yarn finger 78 is rendered inactive, whereas no butt engages the lever 86 and therefore the finger 79 is rendered active; in Fig. 14 a height B of butt comes opposite each lever 83 and 86, and therefore both yarn fingers 78, 79 are in action; and in Fig. 15 an intermediate height of butt C comes opposite each lever 83, 86 and therefore both yarn fingers 78, 79 are rendered inactive. The relative positions of the slots in the ledge 51 of plate 44 and the levers 57, 57' is clearly indicated in Figs. 12, 13a, 14a and 15a.

In this embodiment of my invention, the construction of plate 44 is the same as in the first described embodiment of the invention, and it is similarly moved lengthwise by the lever 86, and the slots in the ledge 51 of the plate 44 are the same excepting that I have provided, as above stated, three slots 55a, 56 and 56a, because obviously the heights of the butts on the trick wheel or pattern drum 77 control the time at which the yarn fingers 78 and 79 are respectively rendered active or inactive, and also control the time and the movements of said plate 44 in a manner entirely similar to that described with respect to the first disclosed embodiment of the invention, and within the scope of my invention.

In the further embodiment of my invention shown in Fig. 16, three yarn fingers 78, 79 and X are employed for feeding three separate yarns, and in such case, a pattern drum or trick wheel 77 would similarly be provided and would act in a similar manner upon levers cooperating with the three yarn fingers 78, 79 and X, and the plate 44 with its ledge 51 would be provided with the necessary slots suitably spaced to cause the described co-action of the parts in an obvious manner, not herein necessary to illustrate.

It will be evident that a lever 57, or 57', moves into one of the slots of the ledge 51 of the plate 44, if such lever is opposite a slot when the yarn pertaining to such lever is out of action. The middle position of a lever, as illustrated by the position of the lever 57 as shown in Fig. 7, is taken only when the yarn pertaining thereto is in action, and both levers 57 and 57' would be in such a position only at the point of yarn change.

I have herein fully described the selected embodiment of means for practising my invention, I have set forth many of the advantages secured thereby, and I have sought to distinguish the accomplishments of my invention from those of the prior art. Certain of the characteristic features of my invention, already described, may, however, well be referred to in a brief summation.

It will be evident from the foregoing disclosure that I have provided a stop motion for strand handling machines, preferably for textile purposes and particularly applicable to and herein shown as co-acting with knitting mechanism, that is capable of stopping the machine when the yarn or yarns thereof is or are unintentionally stopped by obstruction at any place, but which stop motion is independent of or not mechanically connected to the control take-up arm or arms for the yarn or yarns, and does not interfere with the frequent or intermittent correcting for slight irregularities in yarn feed which is effected through movements of the control take-up arm or arms. The stopping means is therefore capable of functioning to stop the machine from unintentional cessation of the yarn movement from any cause, although independent of and not mechanically connected to any control take-up arm.

A distinguishing and important feature of the stopping means, which is not disclosed in my said patents, and is herein broadly claimed, is a successively or periodically and preferably constantly moving electrical switch which is operated by obstruction of, that is, by interfering with its movement. Such switch is, in the disclosed embodiment of the invention, mounted on a member or lever constantly moved to and fro, and the stop motion is operated through the action of said switch if and when any lever 12 or equivalent part moves to either end of its possible range or path of movement, but is not operated upon movement of such lever or equivalent part intermediate the ends or extremes of its possible movement, and which movement or movements of lesser extent or range is or are very frequently occurring to correct slight inevitable irregularities in the feeding of the yarn or yarns.

The part or parts carrying the said switch act in a sense as a feeler or testing means associated to function with but not connected to any control take-up arm, so that certain positions of a control take-up arm serve to preserve or rectify the proper feeding of the yarn or yarns, and yet said control take-up arm or arms does not or do not initiate of itself or themselves the stopping action through any mechanical connection to such control take-up arm or arms. Thus, there is no initial effort on the part of the yarn or any tax or strain thereon to operate the stopping means, and this avoids not only any uncertainty in the action of the stopping means but prevents a constant strain being put upon the yarn or yarns for the ultimate purpose of stopping the machine in the event of yarn breakage.

The stop motion is selectively rendered ineffective as to any yarn or yarns—that is, it is selectively thrown out of operation as to any yarn when that yarn is intentionally discontinued by the machine. The stop motion of my invention does not rely on the yarn itself acting to operate the stop motion. On the contrary, an existing condition in the yarn, whether it be yarn breakage or something more than the inevitable slight irregularities but less than yarn breakage, causes a positioning of the parts so that the positively acting stop motion means acts of its own accord as it finds the existence of a condition calling for stopping the machine.

The stop motion operates under yarn conditions calling for machine stoppage, no matter how light a tension is placed on the yarn or yarns by the control take-up arm or arms therefor. The stopping means is capable of stopping the machine when the yarn is unintentionally stopped by obstruction at any place, or by any unintentional cessation of the yarn movement.

With yarn furnishing means of any suitable type, I have combined positively acting machine stopping means, and also yarn change or yarn variation means, all of said means being coordinated in action, and in the preferred embodiment of my invention herein shown, furnishing gears are employed which positively feed the yarn when in mesh, and which are separated or unmeshed, in sychronizing relation to the movement of the yarn finger for that yarn, from feeding relation to the knitting needles. The yarn change or yarn variation means is herein shown as a horizontal striper, but this is merely shown as the selected example of an element or feature of the novel combination which includes yarn furnishing means, and machine stopping means not mechanically connected with the yarn furnishing means but coordinated therewith as fully explained.

While certain features of this invention have been herein described particularly with reference to a furnishing device or mechanism, consisting of gears which may mesh to varying depths in order to accommodate either stitch change or variations of stitches, and which may also even unmesh under certain conditions, such as for yarn change, it is to be understood that the subject-matter of this invention may be embodied in any type of furnishing mechanism capable of furnishing yarn at varying rates and at the same time also capable of ceasing to furnish yarn and then resuming the feed thereof, all in accordance with machine demand alone. It is recognized that there are instances in the prior art of furnishing mechanism capable of varying the yarn feed according to machine demand, and that there are other instances (apart from those just referred to) wherein yarn may be either constantly fed or not fed in accordance with the machine demand only. These remarks are addressed to those skilled in the art to enable them readily to distinguish this invention from what has previously been done.

Having thus described one illustrative embodiment of my invention, it is to be understood that although specific terms are employed, they are used in a generic and descriptive sense and not for purposes of limitation, the scope of the invention being set forth in the following claims.

I claim:

1. In combination, in a knitting machine for knitting a plurality of yarns, yarn furnishing means acting to feed each yarn under substantially uniform tension; yarn change means at the needles for changing yarns fed by said yarn furnishing means, together with means controlled solely by a yarn of said plurality of yarns to cause feeding of said yarn by the said yarn furnishing means solely because of machine demand.

2. In combination, in a knitting machine for knitting a plurality of yarns, yarn furnishing means acting to feed each yarn under substantially uniform tension; yarn change means at the needles for changing yarns fed by said yarn furnishing means, together with means controlled solely by a yarn of said plurality of yarns to cause feeding of said yarn by the said yarn furnishing means solely because of machine demand and to stop feeding of said yarn by the said yarn furnishing means because of lack of machine demand.

3. In combination, in a knitting machine for knitting a plurality of yarns, yarn furnishing means acting to feed each yarn under substantially uniform tension; yarn change means at the needles for changing yarns fed by said yarn furnishing means, and a main control take-up member for each yarn, together with means controlled solely by the yarn whereby the inactive yarn upon re-presentation thereof will derive its tension immediately and solely from the said main control take-up member pertaining thereto.

4. As coordinated mechanism for effecting the selective, controlled, positive feeding under substantially uniformly maintained tension, in accordance with machine demand, of a plurality of yarns to a knitting machine having knitting needles and operating means therefor, the following co-acting instrumentalities operated from the driving means of the knitting machine, viz: a plurality of yarn fingers at the needles for presenting respective yarns to said needles in the knitting operation; yarn change means to move said yarn fingers selectively into and out of yarn feeding position; intermeshing furnishing gears positively to furnish to the needles by said yarn fingers, respectively, each of said yarns with maintained, substantially uniform tension so long as such yarn is fed to the needles; and means synchronized in action with said yarn change means and said furnishing gears to interrupt immediately at the said furnishing gears, by unmeshing said gears, all feeding thereby of that yarn whose yarn finger is moved selectively out of yarn feeding position at the needles, and to restore feeding of said yarn by such gears, in intermeshed relation, with substantially uniformly maintained tension, immediately upon the restoration of the yarn finger to yarn delivering position.

5. A stop motion for knitting machines having means to feed a series of yarns, one or more of which may be intentionally discontinued by the said machine feeding means, and means for rendering said stop motion selectively ineffective as to any of said yarn or yarns.

6. A stop motion for knitting machines having means to feed a series of yarns, one or more of which may be intentionally discontinued by the said machine feeding means, and means for selectively rendering said stop motion ineffective as to any yarn the feed whereof is discontinued through action of said yarn feeding means.

7. A combination according to claim 3, but in which the inactive yarn is maintained while inactive, in position for re-presentation thereof, substantially without tension change, in accordance with machine demand, when the yarn change calls for such restoration.

8. A knitting machine with stop motion and yarn feeding means for a series of yarns as defined in claim 5, but wherein rotary yarn feeding members constituting yarn furnishing means are provided, acting in coordination to furnish each such yarn to its feeding means in accordance with machine demand therefor.

9. A strand-controlled stop motion for a strand-using textile machine having means to feed a series of strands to such machine for manipulation thereby, one or more of which strands may be intentionally discontinued by the feeding means to said textile machine, and means for rendering said stop motion selectively ineffective as to any one of said strands.

10. A strand-using textile machine with stop motion as defined in claim 9, but wherein the said stop motion is selectively rendered ineffective as to any strand, the feed whereof to the said machine is discontinued through action of the strand feeding mechanism.

11. In a knitting machine having a plurality of yarn fingers at the needles movable into and out of feeding position; rotatable yarn furnishing members for said yarns; means whereby the moving of a yarn finger out of feeding position causes substantially instant ceasing of further supply of the yarn pertaining to said yarn finger by the said yarn furnishing members pertaining thereto; and stop-motion means caused to function by an obstruction in the feeding of any yarn, the yarn finger whereof is in feeding position, but which stop motion is ineffective with respect to any intentionally withdrawn yarn.

12. A combination in accordance with claim 1, but in which cooperating stop-motion means is provided for the knitting machine, and in coordination with which there is provided means for rendering said stop-motion means selectively ineffective as to any of said yarns.

13. A combination in accordance with claim 2, but in which cooperating stop-motion means is provided for the knitting machine, and in coordination with which there is provided means for rendering said stop-motion means selectively ineffective as to any of said yarns.

14. In a knititng machine having a plurality of yarn fingers at the needles movable into and out of feeding position; rotary yarn feeding members constituting yarn furnishing means to feed said yarns, means whereby the moving of a yarn finger out of feeding position causes substantially instant ceasing of further supply of the yarn pertaining to such yarn finger by the said yarn furnishing means pertaining thereto, positively operated stop-motion means to stop the machine in the event of obstruction of any of the feeding yarns, and controlling means for the stop-motion means, coordinated in action with the yarn change movement of the yarn fingers, to prevent the said stop-motion means from acting because only of the occurrence of yarn change at the yarn fingers, and when lacking the obstruction of any of said feeding yarns.

15. In a knitting machine having a plurality of yarn fingers at the needles movable into and out of feeding position, rotary yarn feeding members constituting yarn furnishing means to feed said yarns, means whereby the moving of a yarn fingers out of feeding position causes substantially instant ceasing of further supply of the yarn pertaining to such yarn finger by the furnishing means pertaining thereto, and stop-motion means caused to function by an obstruction in the feeding of any yarn, the yarn finger whereof is in feeding position, but which stop motion is ineffective with respect to any intentionally withdrawn yarn.

16. In combination, in a knitting machine for knitting a plurality of yarns, yarn furnishing means adapted to be controlled as to yarn feeding position thereof by the yarns, and acting to feed each yarn under substantially uniform tension upon each presentation thereof at the needles; yarn change means at the needles for changing yarns fed by said yarn furnishing means, together with means controlled by a yarn of said plurality of yarns to position said yarn furnishing means so as to cause feeding of said yarn at such uniform tension by yarn feeding movement of said yarn furnishing means solely because of machine demand.

17. As coordinated mechanism for effecting the selective, controlled, positive feeding under substantially uniformly maintained tension, in accordance with machine demand, of a plurality of yarns to a knitting machine having knitting needles and operating means therefor, the following co-acting instrumentalities operated from the driving means of the knitting machine, viz: a plurality of yarn fingers at the needles for presenting respective yarns to said needles in the knitting operation; yarn change means to move said yarn fingers selectively into and out of yarn feeding position; rotary yarn feeding members constituting means to furnish to the needles by said yarn fingers, respectively, each of said yarns with maintained, substantially uniform tension so long as such yarn is fed to the needles; machine-stopping means for stopping the machine in the event of cessation or obstruction of any feeding yarn; and machine-stopping controlling means to prevent the said machine stopping means from acting because only of yarn change at the yarn fingers, and synchronized in movement with the action of the said yarn-change means; whereby the fabric produced by said mechanism is composed of knitted loops of substantially uniform tension.

18. A combination according to claim 17, but in which said machine stopping means acts in the event of yarn breakage of any feeding yarn.

19. A combination according to claim 17, but in which positively operated feeler means is provided to ascertain in rapid repetition whether a condition of a feeding yarn or yarns exists calling for machine stoppage and in such event to initiate the action of the machine stopping means.

20. A combination according to claim 17, but in which a control take-up is provided for each yarn and which is operatively connected to the furnishing means for the yarn to change the speed of feed of such yarn to meet the machine demand.

21. A combination according to claim 17, but in which the machine stopping means contains feeler means which is mechanically non-connected with the control take-up arms, but nevertheless initiates the operation of the machine stopping means if a control take-up arm is so moved by yarn breakage or yarn obstruction as to indicate such condition.

22. A combination according to claim 17, but in which positively operated feeler means is provided to ascertain in rapid repetition whether a condition of a feeding yarn or yarns exists calling for machine stoppage and in such event to initiate the action of the machine stopping means, and in which combination means is provided to prevent the feeler means from initiating the action of the machine stopping means because of any yarn selectively removed from action at its yarn finger.

23. As coordinated mechanism for effecting the selective, controlled, positive feeding under substantially uniformly maintained tension, in accordance with machine demand, of a plurality of yarns to a knitting machine having knitting needles and operating means therefor, the following co-acting instrumentalities operated from the driving means of the knitting machine, viz: a plurality of yarn fingers at the needles for presenting respective yarns to said needles in the knitting operation; yarn change means to move said yarn fingers selectively into and out of yarn feeding position; rotary yarn feeding members constituting means to furnish to the needles by said yarn fingers, respectively, each of said yarns with maintained, substantially uniform tension so long as such yarn is fed to the needles, machine-stopping means for stopping the machine in the event of cessation or obstruction of any feeding yarn, and machine-stopping controlling means to prevent the said machine-stopping means from acting because only of yarn change at the yarn fingers, whereby the fabric produced by said mechanism is composed of knitted loops of substantially uniform tension.

24. A stop motion mechanism for a knitting machine that is provided with yarn feeding means for a plurality of yarns, control take-up arms respectively pertaining to each of said yarns, and positively acting power-operated means adapted to be operatively connected to the actual machine stoppage device, and functioning without initial effort from the control take-up arm or arms, to stop the machine in the event of a yarn condition that calls for machine stoppage.

25. A stop motion for knitting machines having means to feed a series of yarns, one or more of which may be intentionally discontinued by the said machine feeding means, and means for rendering said stop motion ineffective as to any of said yarn or yarns intentionally discontinued.

26. A stop motion for knitting machines having means to feed a series of yarns, one or more of which may be intentionally discontinued by the said machine feeding means, and means for rendering said stop motion ineffective as to any yarn the feed whereof is discontinued through action of said yarn feeding means.

27. In a knitting machine for knitting a plurality of yarns, the following parts in coordinated relation, viz: yarn fingers at the needles for said yarns respectively, yarn control means for each of said yarn fingers; machine stopping means acting in the event of a defective yarn feeding condition calling for machine stoppage; rotary yarn feeding members constituting yarn furnishing means to feed each of said yarns to the needles and means cooperatively related to and acting through said yarn control means upon a yarn finger or fingers to change the yarn feeding condition of the yarn or yarns thereof without causing, as a consequence thereof, machine stoppage by the machine stopping means.

28. In a knitting machine for knitting a plurality of yarns, the following parts in coordinated relation, viz: yarn fingers at the needles for said yarns respectively; yarn changing means for said yarn fingers; machine stopping means acting in the event of a defective yarn feeding condition calling for machine stoppage, rotary yarn feeding members constituting furnishing means to feed said yarns, and means synchronized in action with said yarn changing means and acting to prevent the actuation of the machine-stopping means because of or incident to the act of changing yarn by said yarn finger.

29. In a knitting machine for knitting a plurality of yarns, the following parts in coordinated relation, viz: yarn fingers at the needles for said yarns respectively; a set of rotatable feeding members having interengageable tooth-like formations for feeding a strand or strands between them, at least one of said members of the set being driven; machine stopping means rendered active upon defective yarn condition calling for machine stoppage; and means operatively related to synchronize with its own action the action of the machine-stopping means to change the feeding position of said yarn fingers at the needles and through such synchronizing action effecting yarn change without causing the machine-stopping means to act.

30. In combination, in a knitting machine for knitting a plurality of yarns; a set of rotary yarn feeding members for each yarn, constituting furnishing means for said yarns; yarn change means at the needles for changing yarns fed by said furnishing means and synchronized in action with the feeding action of said furnishing means; and means synchronized in action with the yarn change means for causing ceasing of yarn feed at said furnishing means, the yarn whereof is rendered inactive by such yarn change, and the restoration by said furnishing means of the feeding of that yarn with immediate substantially uniformly maintained tension in accordance with machine demand.

31. In a knitting machine having a plurality of yarn fingers at the needles movable into and out of feeding position; a set of furnishing gears for each of said yarns; means whereby the moving of a yarn finger out of feeding position causes instant ceasing of further supply of the yarn pertaining to such yarn finger by the furnishing gears pertaining thereto, positively operated stop motion means to stop the machine in the event of obstruction of any of the feeding yarns, and controlling means for the stop-motion means, coordinated in action with the yarn change movement of the yarn fingers, to prevent the said stop-motion means from acting because only of the ocurrence of yarn change at the yarn fingers, and when lacking the obstruction of any of said feeding yarns.

32. A combination according to claim 31, but in which the movement of a yarn finger out of feeding position at the needles is synchronized with the unmeshing of the furnishing gears for the yarn withdrawn by said yarn finger.

33. In a knitting machine having a plurality of yarn fingers at the needles movable into and out of feeding position; a set of furnishing gears for each of said yarns; means whereby the moving of a yarn finger out of feeding position causes instant ceasing of further supply of the yarn pertaining to such yarn finger by the furnishing gears pertaining thereto, and stop motion means caused to function by an obstruction in the feeding of any yarn, the yarn finger whereof is in feeding position, but which stop motion is ineffective with respect to any intentionally withdrawn yarn.

34. Stop motion mechanism for textile and like strand-feeding machines, having an electric switch that is adapted to be, by circuit wires, operatively connected by its terminals to the actual machine-stopping device, movable carrying means for said switch, means to impart a succession of bodily movements to said switch with its terminals and said carrying means to ascertain strand-feeding condition, and a movable part, the position whereof is determined by strand-feeding condition, said switch carrying member engaging said movable part if the strand condition calls for machine stoppage, and therefore functioning to cause the machine to stop when a strand condition calling for machine stoppage is found by said movements to exist, without contact of said switch carrying member with the strand.

35. Stop motion mechanism for textile and like strand-feeding machines, having an electric switch that is adapted to be, by circuit wires, operatively connected by its terminals to the actual machine-stopping device, movable carrying means for said switch, means to impart a succession of bodily feeling movements to said switch with its terminals and said carrying means to ascertain strand-feeding condition, and a movable part, the position whereof is determined by strand-feeding condition, said switch carrying member engaging said movable part if the strand condition calls for machine stoppage, and means to operate the machine stopping device if unintentional cessation of strand feeding movement is found by said feeling movements to exist, without contact of said switch carrying member with the strand.

36. Stop motion mechanism for textile and like strand-feeding machines, having an electric switch that is adapted to be, by circuit wires, operatively connected by its terminals to the actual machine-stopping device, movable carrying means for said switch, means to impart a succession of bodily feeling movements to said switch with its terminals and said carrying means to ascertain strand-feeding condition, and a movable part, the position whereof is determined by strand-feeding condition, said switch carrying member engaging said movable part if the strand condition calls for machine stoppage, and means to operate the machine stopping device if strand breakage is found by said feeling movements to exist, the construction and relation of parts being such that the said switch carrying member and parts carried thereby at no time contact with the strand in the determination of its feeding condition.

37. Stop motion mechanism for textile and like strand-feeding machines, having an electric switch that is adapted to be, by circuit wires, operatively connected by its terminals to the actual machine-stopping device, a vibratory member carrying said electric switch and its terminals, means to impart repeated rapid feeler vibrations to said member to ascertain strand-feeding conditions, and thereupon functioning to cause the machine to stop when strand condition calling for machine-stoppage is thereby found to exist, and a movable member sensitively responsive to and having its position controlled by the strand-feeding condition and adapted in the said functioning of the parts to act upon the switch of said vibratory member if the strand-feeding condition is such as to call for machine stoppage.

38. Stop motion mechanism for textile and like strand-feeding machines, having an electric switch that is adapted to be, by circuit wires, operatively connected to the actual machine-stopping device, a vibratory member carrying said electric switch, and means to impart repeated rapid feeler vibrations to said member to ascertain strand-feeding conditions, and one or more movable parts each having a range or path of movement caused by changes in strand-feeding condition, said movable part or parts being so positioned and related to the path of said feeler vibrations as to be engaged by said vibratory member, and thereupon to cause the machine to stop in the event that a strand condition occurs calling for machine stoppage, with resulting stop-indicating position of the part so engaged.

39. Stop motion mechanism for textile and like strand-feeding machines, having an electric switch that is adapted to be, by circuit wires, operatively connected to the actual machine-stopping device, a vibratory member carrying said electric switch, and means to impart repeated rapid feeler vibrations to said member to ascertain strand-feeding conditions, and one or more parts each caused to move to and fro by changes in the feeding condition of a strand pertaining thereto, said vibratory member being so positioned and related to the said part or parts as to engage the same and thereby cause machine-stoppage in the event of unintended cessation of a strand pertaining to the one of said parts so engaged.

40. Stop motion mechanism for textile and like strand-feeding machines, having an electric switch that is adapted to be, by circuit wires, operatively connected to the actual machine-stopping device, a vibratory member carrying said electric switch, and means to impart repeated rapid feeler vibrations to said member to ascertain strand-feeding conditions, and a series of swinging levers each pertaining to one of said strands, said levers each having a path of movement, a portion whereof is caused by slight strand variations not calling for machine stoppage, and a further portion of which path of movement is caused by strand condition calling for machine-stoppage, said levers being so mounted that any one of them is struck in the vibratory movement of said member if encountered in such further portion of its path of movement, thereby initiating the action of the machine stopping device.

41. Stop motion mechanism for textile and like strand-feeding machines, having an electric switch that is adapted to be, by circuit wires, operatively connected to the actual machine-stopping device, a vibratory member carrying said electric switch, and means to impart repeated rapid feeler vibrations to said member to ascertain strand-feeding conditions, a series of swinging levers each pertaining to one of said strands, a strand controlled take-up arm connected to each lever respectively, said levers each having an arc of movement wherein a lever swung to either end of such arc of movement indicates a strand condition calling for machine-stoppage, said vibratory member having a part to strike in its said vibratory feeling movement a swinging lever that is so positioned in its arc of movement as to be indicative of need for machine stoppage, and thereupon acting through said switch to stop the machine.

42. In a knitting machine, means to feed a yarn or yarns, a control take-up member for each yarn, responsive in movement to inevitable slight irregularities and also responsive in more prolonged movement to a yarn condition calling for machine-stoppage, and positively acting stop motion means structurally distinct from but co-operating with said control take-up arm or arms, and mechanically non-connected thereto and non-engageable therewith in operation, so that no stress is imposed upon the control take-up member making such prolonged movement but whereby stopping of the machine is effected without such stress, in the event that a control take-up arm moves to a position induced by a condition of its yarn calling for machine stoppage.

43. In a knitting machine, means to feed a yarn or yarns, a control take-up member for each yarn, responsive in movement to inevitable slight irregularities and also responsive in more prolonged movement to a yarn condition calling for machine stoppage, a movable member operatively related to and co-acting with, but non-connected with, to each control take-up arm respectively and having a path of movement controlled by the movements of its control take-up arm, and positively acting stop motion means structurally separate from but co-acting with said parts, but adapted to engage said movable member when so positioned for machine stoppage and thereby to cause the machine to stop, but without engaging the corresponding control take-up arm, whereby no stress is imposed upon the latter in the machine stopping action.

44. In a knitting machine, means to feed one or more yarns, a separate, movable, control take-up arm for each yarn permitting an exceedingly light tension to be placed thereby upon the yarn, and positively acting stop motion means independent of but cooperating with said control take-up arms and at all times non-engageable therewith and non-connected thereto, but functioning by reason of such cooperation to stop the machine in the event of a defective yarn feeding condition calling for machine stoppage, as indicated by extreme movement of the control take-up arm pertaining thereto, thus effecting the machine-stopping action without thereby stressing the control take-up arm pertaining to such yarn.

45. In a knitting machine, means to feed one or more yarns, a movable control take-up arm for each yarn, and stopping means responsive in its action to an obstructed yarn condition at any point in the course of the said yarn or yarns, as indicated by extreme movement of the control take-up arm pertaining thereto, and positively operating other non-contacting cooperation with such control take-up arms to stop the machine in the event of unintentional obstruction of a feeding yarn or yarns as so indicated, said stopping means at all times being mechanically non-connected to and non-engageable with the said control take-up arms, thus effecting the machine-stopping action without thereby imposing stress upon the control take-up arm whose yarn is obstructed.

46. A knitting machine having means to feed a plurality of yarns thereto; a control take-up arm for each yarn; and stop motion means not mechanically connected to any of said control take-up arms, said arms each having a limited amplitude of movement caused by correcting for slight irregularities, and having a greater amplitude of movement caused by unintentional stoppage of a yarn through obstruction at any point; and a member positively moved in a rapid series of feeling movements to ascertain whether a position of a control take-up arm has occurred calling for machine stoppage because of yarn obstruction, and in such event to stop the machine.

47. A knitting machine having means to feed a plurality of yarns thereto; a control take-up arm for each yarn; and stop motion means not mechanically connected to any of said control take-up arms, said arms each having a limited amplitude of movement caused by correcting for slight irregularities, and having a greater amplitude of movement caused by unintentional stoppage of a yarn through obstruction at any point; and a member positively moved in a rapid series of feeling movements to ascertain whether a position of a control take-up arm has occurred calling for machine stoppage because of yarn obstruction, and in such event to stop the machine, without imparting stress to the control take-up arm and thus permitting the use of control take-up arms placing only an exceedingly light tension upon the yarns.

48. Stop motion means for knitting machines having yarn feeding means for a series of yarns and having a vibratory member operatively connected to the actual machine stopping device, means operated from a going part of the knitting machine to impart rapid feeler vibrations to said member to ascertain yarn feeding conditions, a series of swinging levers, each pertaining to one of said yarns and each of said levers having a path of movement, an intermediate portion whereof is caused by slight changes in yarn feeding movement but prolongations of which path of movement are caused by a yarn condition calling for machine stoppage, each of said levers being so located for swinging movement as to be struck in the vibratory movement of said member when in said position calling for machine stoppage, thereby initiating the action of the machine stopping device.

49. A combination according to claim 48, but in which the vibratory member is a lever operated by a driven cam of the machine and said lever carries a part that directly strikes one of said swinging levers when in position for machine stoppage, and thereupon functions to operate the actual machine stopping device.

50. A combination according to claim 48, but in which said vibratory member has a plate operatively connected thereto and positioned to strike a swinging yarn lever when the latter is in a position calling for machine stoppage and thereby to operate the actual machine stopping device.

51. A combination according to claim 48 but in which said vibratory member has a feeler plate capable of a slight relative movement with respect to said vibratory member, and in such movement to operate the actual machine stopping device, said plate having a formation so shaped as to cause said plate to strike a yarn lever if found thereby to be positioned in yarn stoppage indicating position.

52. A combination according to claim 48 but in which said vibratory member has a feeler plate capable of a slight relative movement with respect to said vibratory member, and in such movement to operate the actual machine stopping device, said plate having a formation so shaped as to cause said plate to strike a yarn lever if found thereby to be positioned in yarn stoppage indicating position, the formation of said plate being such that it will not strike a yarn lever, the position whereof is due only to slight inequalities in the yarn feed not calling for machine stoppage.

53. Stop motion means for knitting machines having yarn feeding means and an electric switch that is operatively connected to the actual machine-stopping device, a vibratory member carrying said electric switch, means operated from a going part of the knitting machine to impart rapid feeler vibrations to said member to ascertain yarn feeding conditions, a series of swinging levers each pertaining to one of said yarns, each of said levers having a path of movement, a portion whereof is caused by slight changes in yarn feeding movement not calling for machine stoppage, and a further portion or portions of which path of movement is or are caused by a yarn condition calling for machine stoppage, said levers each being so mounted for swinging movement as to be struck in the vibratory movement of said member when in such position calling for machine stoppage, whereby initiating the action of the machine stopping device.

54. A combination according to claim 53, but in which the vibratory member is a lever operated by a driven cam, and said lever moves a part that directly strikes such swinging lever positioned for machine stoppage, said part being capable of movement upon such strikage to operate the switch.

55. A combination according to claim 53, but in which said vibratory member has a plate connected thereto and positioned to strike a yarn lever when the latter is in a position calling for machine stoppage.

56. A combination according to claim 53, but in which said vibratory lever carries a plate adapted to feel for the said yarn levers and upon finding and striking one in position calling for machine stoppage to move the functioning part of the switch to stop the machine.

57. A combination according to claim 53, but in which said vibratory member has a feeler plate capable of a slight relative movement with respect to said vibratory member and in such movement to actuate said switch, said plate having a formation so shaped as to cause said plate to strike any of said levers if positioned in machine stopping position but not to strike said levers otherwise.

58. A combination according to claim 53, in which a plate is moved by movement of said vibratory lever, and constitutes the part to engage directly any of said swinging levers in machine stopping position, said plate having a recess provided with front and back ledges, said ledges constituting the means for lever impact resulting in machine stoppage.

59. A combination according to claim 53, but in which the vibratory lever directly carries the switch and a plate is operatively connected to move with the vibratory lever in its feeling movement and consequent upon the movement of said plate being obstructed, to operate the switch to stop the machine.

60. A combination according to claim 53, but in which the vibratory lever has a plate located above and in close proximity to the upper ends of said swinging levers, and said plate has a recess upon its under face of such extent that the plate does not strike any of said levers if positioned merely by slight inequality-correcting movements, said plate having formations positioned to contact with any of said levers that has a position induced by such yarn condition as to call for machine stoppage.

61. A combination according to claim 53, but in which the vibratory lever has a part connected thereto above and in close proximity to the upper ends of the said swinging levers, and having a ledge provided with one or more transversely extending slots, said ledge being so supported by said part that in the vibratory movement of said vibratory lever an unslotted portion of said ledge strikes against any of said swinging levers occupying a position induced by a yarn condition calling for machine stoppage.

62. A combination according to claim 53, but in which the vibratory lever has a part connected thereto above and in close proximity to the upper ends of the said swinging levers, said part carrying a readily removable transversely slotted ledge positioned to strike upon the upper end of any of said swinging levers that occupies a position induced by a condition of yarn calling for machine stoppage.

63. A combination according to claim 53, but in which the vibratory lever has a part connected thereto above and in close proximity to the upper ends of the said swinging levers, said part carrying a readily removable transversely slotted ledge positioned to strike upon the upper end of any of said swinging levers that occupies a position induced by a condition of yarn calling for machine stoppage, said part having a recess upon its under side, one wall of which is constituted by said removable ledge and an opposite wall by another ledge, said part and its ledges being so positioned that any of said swinging levers having a position induced by yarn condition calling for machine stoppage will be struck by one of said ledges.

64. In combination in a knitting machine having a plurality of yarn fingers at a feeding station of the needles: selective means operatively related to said yarn fingers to render them active or inactive in accordance with pattern dictation of the machine; yarn furnishing mechanism for positively feeding a distinct yarn to each of said yarn fingers at the needles, said yarn furnishing mechanism including one or more sets of driven, rotary, toothed, interengaging members for feeding positively a yarn or yarns between them to said yarn fingers; and a separate control guide arm for each of said yarns between said yarn furnishing mechanism and said yarn fingers respectively, supported for movement to and fro consequent upon all variations in yarn feeding tension, and operatively connected to said yarn furnishing mechanism to change the extent of mesh of said toothed members in accordance with yarn tension, said guide arms being respectively movable further upon yarn selective withdrawal through movement of the corresponding yarn finger at the needles to inactive position; said parts being operatively related and cooperating together to cause the ceasing of the feeding of any yarn at and by the said furnishing mechanism, consequent upon movement of the corresponding yarn finger for that yarn into inactive position at the needles of said knitting machine.

65. A combination according to claim 64, but in which the said further movement of a control guide arm when its yarn is rendered inactive by movement of its said yarn finger into active position at the needles, causes the unmeshing of the rotary toothed members for that yarn.

66. A combination according to claim 64, but in which the said further movement of a control guide arm when its yarn is rendered inactive by movement of its said yarn finger into active position at the needles, causes the unmeshing of the rotary toothed members for that yarn, and the restoration of that yarn to action at the needles through movement of its said yarn finger into active position at the needles causes the remeshing of the said rotary toothed members for that yarn, and the consequent immediate feeding of the said restored yarn at the requisite yarn feeding tension.

67. A combination according to claim 64, but in which machine stop motion means is provided to stop the knitting machine upon yarn breakage or yarn obstruction of any feeding yarn, with an increased extent of to and fro movement of the control guide arm pertaining to that yarn, and in which means is also provided to prevent the operation of said stop motion means through mere movement of a yarn finger at the needles into inactive position.

68. In a stop motion mechanism for textile and like machines for handling material in strand form, feeding means for the strand, machine stop motion means, a part moved by an operating member of the machine to feel for the feeding strand, and an electric switch operatively connected to said machine stop motion means and carried by said movable part, and caused to function upon obstruction of said movement of such part, due to defect in the feeding movement of said strand, to stop the said machine.

69. In coordination in a knitting machine having a plurality of yarn fingers at a feeding station of the needles, selective means operatively related to said yarn fingers to render them active or inactive in accordance with pattern dictation of the machine; yarn furnishing means acting positively to feed yarns to said yarn fingers respectively; a control guide arm for each of said yarns respectively and mounted for to and fro movement in accordance with the feeding tension of the yarn pertaining thereto and operatively connected to said yarn furnishing means to modify the action thereof for the purpose of maintaining substantially uniform the tension of the feeding yarn or yarns, a movable feeler member to feel for and ascertain the feeding condition of each feeding yarn, by engaging in its feeling movement, a movable part, the position whereof depends upon the feeding condition of a yarn pertaining thereto; machine stop motion means to which said feeler member is operatively connected to stop the machine upon detected defective feeding condition of a feeding yarn such as to call for machine stoppage, a plate movable with said feeler member and constituting the portion thereof to engage such movable part positioned by a yarn in such defective feeding condition; and means to change the position of said plate in synchronism with the selective movements of the yarn guide fingers at the needles so as to present to the said movable part pertaining to a yarn whose yarn finger has just been rendered inactive, through pattern control at the needles, a formation ineffective to operate said machine stop motion means.

70. A combination in accordance with claim 69, but in which the selective means for the yarn fingers and the said plate are connected by a Bowden wire to obtain the said synchronized movements.

71. A combination in accordance with claim 69 but in which the said plate is provided with spaced slotted portions, and intervening, solid, stop-motion-actuating portion or portions, and in which combination means are provided to connect in movement the said plate and the said selective means for the yarn fingers, thereby to effect synchronization in the movements of said yarn fingers and said plate.

72. In a novel sub-combination in a yarn feed control of a knitting machine having means to feed a plurality of yarns and having a corresponding plurality of control guide arms for said yarns respectively, which are mounted for to and fro movements in accordance with the feeding tension of the respective yarns; a corresponding plurality of movably mounted members operatively connected to said control guide arms respectively and by them moved into and out of functioning position with respect to a functioning, movable feeler element of the machine, each of said movable members having an extension finger manually movable into active and inactive positions, so that when moved into inactive position the movable members carrying such inactively positioned finger cannot be operated by such movable feeler element of the machine, regardless of the position of such movable member with respect to the path of movement of said feeler element.

73. As a novel element in a sub-combination of parts for effecting a yarn feed control of a knitting machine having means to feed one or more yarns and having a corresponding number of resilient control guide arms for said yarn or yarns respectively, and which resilient guide arms are mounted for to and fro movements in accordance with the feeding tension of the respective yarns; a resilient control guide arm of said sub-combination having a yarn guide eye formation remote from the point of support of the said resilient guide arm, and a more highly resilient arm secured to and constituting a prolongation of such guide arm and having a yarn guide eye formation relatively remote from said other guide eye, said prolongation constituting a shock-absorbing take-up.

74. A structure according to claim 73, but combined with which is a yarn guide eye supported independently of said guide arm having the prolongation but in substantial proximity thereto, so that the yarn may in its feeding movement pass through the independently supported eye intermediate of its passage through the other two yarn guide eyes.

75. Stop motion mechanism for knitting machines, equipped with means for feeding a yarn to the needles thereof under substantially uniformly maintained tension in accordance with machine demand, an electric switch that is by its contacts adapted to be, by circuit wiring, operatively connected to the actual machine-stopping device of the stop motion mechanism; a movable feeling or testing member carrying said switch and its contacts; means to impart rapid vibratory movements to said member with its switch and contacts, in the ascertainment of the feeding condition of said yarn; and a movable part pertaining to the feeding yarn and having a path of movement that is dependent upon the yarn feeding condition and is altered by changes in such condition; said movable part being adapted to act upon the feeling or testing member if the strand feeding condition is such as to call for machine stoppage and thereupon so change the condition of said switch as to cause machine stoppage.

76. A combination according to claim 75, but in which a movable yarn take-up arm is provided that directly engages the yarn, and which itself in its movements moves the said movable part that acts upon the said vibratory feeling or testing member, so that the machine is caused to be stopped when the yarn feeding condition calls therefor, without direct engagement of said vibratory member or of said movable part with the yarn and without placing additional stress upon the yarn.

ROBERT H. LAWSON.